(12) United States Patent
Dion et al.

(10) Patent No.: US 11,761,128 B2
(45) Date of Patent: Sep. 19, 2023

(54) TOPOLOGY OPTIMIZATION FOR MODELING AND PREDICTION OF COMPLEX FABRIC STRUCTURES AND PROPERTIES

(71) Applicants: Drexel University, Philadelphia, PA (US); The Trustees of the University of Pennsylvania, Philadelphia, PA (US)

(72) Inventors: Genevieve Eugenie Dion, Philadelphia, PA (US); Randall Kamien, Philadelphia, PA (US); Michael David Tanis, Philadelphia, PA (US); Amy Lynne Stoltzfus, Philadelphia, PA (US); Chelsea E. Amanatides, Manlius, NY (US); Toen Castle, Orange (AU); David Edward Breen, Yardley, PA (US); Paras Wadekar, Philadelphia, PA (US)

(73) Assignees: Drexel University, Philadelphia, PA (US); The Trustees of the University of Pennsylvania, Philadelphia, PA (US)

(*) Notice: Subject to any disclaimer, the term of this patent is extended or adjusted under 35 U.S.C. 154(b) by 528 days.

(21) Appl. No.: 16/981,681

(22) PCT Filed: Mar. 18, 2019

(86) PCT No.: PCT/US2019/022733
§ 371 (c)(1),
(2) Date: Sep. 16, 2020

(87) PCT Pub. No.: WO2019/182964
PCT Pub. Date: Sep. 26, 2019

(65) Prior Publication Data
US 2021/0095403 A1 Apr. 1, 2021

Related U.S. Application Data

(60) Provisional application No. 62/644,397, filed on Mar. 17, 2018.

(51) Int. Cl.
*G06F 30/20* (2020.01)
*D04B 37/02* (2006.01)
(Continued)

(52) U.S. Cl.
CPC .............. *D04B 37/02* (2013.01); *D04B 37/06* (2013.01); *G06F 30/20* (2020.01); *G06F 2113/12* (2020.01)

(58) Field of Classification Search
CPC ......... D04B 37/02; D04B 37/06; G06F 30/20; G06F 2113/12
(Continued)

(56) References Cited

U.S. PATENT DOCUMENTS 5,016,183 A 5/1991 Shyong
5,255,352 A 10/1993 Falk
(Continued)

FOREIGN PATENT DOCUMENTS

WO WO 2008/122751 A2 10/2008

OTHER PUBLICATIONS

Karen E. Conty (flexible fabrication: knitting yarns in architecture, 141 pages) (Year: 2009).*
(Continued)

*Primary Examiner* — Andre Pierre Louis
(74) *Attorney, Agent, or Firm* — Jenkins, Taylor & Hunt, P.A.

(57) ABSTRACT

A method for modeling textile structures using bicontinuous surfaces includes selecting a virtual scaffold of bicontinuous surfaces defining textile fabrication pathways to model spatial relationships between the pathways and yarns in a desired yarn pattern of a textile fabric design. The method further includes constructing a yarn pathway across the bicontinuous surfaces that form the virtual scaffold. The method further includes removing or releasing tension from
(Continued)

the virtual scaffold, thereby allowing yarns to relax and determining a physical property of the textile fabric design.

30 Claims, 30 Drawing Sheets

(51) Int. Cl.
   *D04B 37/06* (2006.01)
   *G06F 113/12* (2020.01)
(58) Field of Classification Search
   USPC .......................................................... 703/6
   See application file for complete search history.

(56) References Cited

U.S. PATENT DOCUMENTS

| | | | |
|---|---|---|---|
| 6,880,367 | B2 | 4/2005 | Suzuki |
| 7,058,471 | B2 | 6/2006 | Watanabe |
| 7,092,782 | B2 | 8/2006 | Lee |
| 7,127,321 | B2 | 10/2006 | Kenji et al. |
| 7,385,601 | B2 | 6/2008 | Bingham et al. |
| 7,386,360 | B2 | 6/2008 | Noriyuki |
| 7,650,018 | B2 | 1/2010 | Tetsuji |
| 7,738,990 | B2 | 6/2010 | Furukawa et al. |
| 8,000,829 | B2 | 8/2011 | Terai |
| 8,135,489 | B2 | 3/2012 | Terai et al. |
| 8,300,044 | B2 | 10/2012 | Furukawa et al. |
| 9,107,462 | B1 | 8/2015 | Heinrich et al. |
| 11,293,124 | B2 | 4/2022 | Morgan et al. |
| 2007/0088453 | A1 | 4/2007 | Noriyuki |
| 2007/0203608 | A1 | 8/2007 | Kang |
| 2009/0091065 | A1 | 4/2009 | Katti et al. |
| 2010/0023305 | A1 | 1/2010 | Furukawa et al. |
| 2011/0046715 | A1 | 2/2011 | Ugbolue et al. |
| 2018/0305847 | A1* | 10/2018 | Wen ........................ D01G 13/00 |
| 2019/0153640 | A1* | 5/2019 | Levinson ................ D04B 21/08 |

OTHER PUBLICATIONS

Non-Final Office Action for U.S. Appl. No. 17/710,915 (dated Mar. 2, 2023).
Arnlind et al., "The World as Quantized Minimal Surfaces," arXiv:1211.1202v1, pp. 1-7 (Nov. 6, 2012).
Peirce et al., "5—the Geometry of Cloth Structure," Journal of the Textile Institute Transactions, vol. 28, No. 3, pp. 1-56 (1937).
Hotte, "An Investigation of Fabric Structure and It's Relation to Certain Physical Properties," Textile Research Journal, vol. 20, No. 12, pp. 811-828 (1950).
Leaf et al., "A Generalized Model of Plain Woven Fabric," Textile Research Journal, vol. 55, No. 2, pp. 1-8 (Feb. 1985).
Hu et al., "Review of cloth modeling," in 2009 ISECS International Colloquium on Computing, Communication, Control, and Management, vol. 4, pp. 338-341 (2009).
Zhao et al., "Permeability measurements and modeling of topology-optimized metallic 3-D woven lattices," Acta Materialia, vol. 81, pp. 326-336 (Dec. 2014).
Zhao et al., "Experimental investigation of 3D woven Cu lattices for heat exchanger applications," International Journal of Heat and Mass Transfer, vol. 96, pp. 296-311 (May 2016).
Zhang et al. "Fabrication and mechanical characterization of 3D woven Cu lattice materials," Materials & Design, vol. 85, pp. 743-751 (Nov. 2015).
Guest et al., "Achieving minimum length scale in topology optimization using nodal design variables and projection functions," Int. J. Numer. Meth. Engng., vol. 61, No. 2, pp. 238-254 (Sep. 2004).
Osanov et al., "Topology Optimization for Architected Materials Design," Annual Review of Materials Research, vol. 46, No. 1, pp. 211-233 (2016).
Santangelo et al., "Triply periodic smectic liquid crystals," Phys. Rev. E, vol. 75, No. 1, pp. 1-12 (Jan. 2007).
Santangelo et al., "Elliptic Phases: A Study of the Nonlinear Elasticity of Twist-Grain Boundaries," Phys. Rev. Lett., vol. 96, No. 13, p. 1-4 (Apr. 2006).
Plateau et al., "Statique Expe'rimentale et The'orique des Liquides Soumis aux Seules Forces Mole'culaires," Nature, vol. X, No. 242, pp. 119-121 (Jun. 18, 1874).
Taylor, "The structure of singularities in soap-bubble-like and soap-film like minimal surfaces," Annals of Mathematics, 2nd Series, vol. 103, No. 3, pp. 1-52 (1976).
Hajduk et al., "The gyroid: A new equilibrium morphology in weakly segregated diblock copolymers", Macromolecules, vol. 27, No. 15, pp. 4063-4075 (1994).
Torquato et al., "Minimal surfaces and multifunctionality, Proceedings of the Royal Society of London," Series A: Mathematical, Physical and Engineering Sciences, vol. 460, No. 2047, pp. 1-9 (2004).
Knittel, et al., "Modelling textile structures using bicontinuous surfaces, under review," Journal of Mathematics and the Arts, arXiv:1807.03627, pp. 1-17 (2018).
Leaf et al., "The geometry of a plain knitted loop," Journal of the Textile Institute Transactions, vol. 46, No. 9, pp. 1-22 (1955).
Munden, "The geometry and dimensional properties of plain-knit fabrics," Journal of the Textile Institute Transactions, vol. 50, No. 7, pp. 1-27 (1959).
Demiroz et al., "A study of the graphical representation of plain knitted structures part I: Stitch model for the graphical representation of plain-knitted structures," Journal of the Textile Institute, vol. 91, No. 4, pp. 1-20 (2000).
Kurbak "Geometrical models for balanced rib knitted fabrics part I: Conventionally knitted rib fabrics," Textile Research Journal, vol. 79, No. 5, pp. 1-18 (2009).
Shanahan et al., "A theoretical analysis of the plain-knitted structure," Textile Research Journal, vol. 40, No. 7, pp. 656-665 (1970).
Hepworth et al., "The mechanics of an idealized weft-knitted structure," Journal of the Textile Institute, vol. 67, No. 7-8, pp. 1-10 (1976).
De Jong et al., "Energy analysis of mechanics of weft-knitted fabrics by means of optimal-control theory, part I: Nature of loop-interlocking in plain-knitted structure," Journal of The Textile Institute, vol. 68, No. 10, pp. 1-11 (1977).
Semnani et al., "A new aspect of geometrical and physical principles applicable to the estimation of textile structures: An ideal model for the plain-knitted loop," Journal of the Textile Institute, vol. 94, No. 3-4, pp. 1-12 (2003).
Choi et al., "An energy model of plain knitted fabric," Textile Research Journal, vol. 73, No. 8, pp. 739-748 (2003).
Choi et al., "The shape and dimensions of plain knitted fabric: A fabric mechanical model," Textile Research Journal, No. 76, No. 10, pp. 777-786 (2006).
Duhovic et al., "Simulating the deformation mechanisms of knitted fabric composites," Composites Part A: Applied Science and Manufacturing, vol. 37, pp. 1897-1915 (2006).
Eberhardt et al., "Knit fabrics, in: D. House," D. Breen (Eds.), Cloth Modeling and Animation, AK Peters, pp. 1-26 (2000).
Wu et al., "Stitch meshing," ACM Transactions on Graphics, vol. 37, No. 4, pp. 130:1-130:14 (2018).
Liu et al., "On the role of material architecture in the mechanical behavior of knitted textiles," International Journal of Solids and Structures, vol. 109, pp. 101-111 (2017).
McCann et al., "A Compiler for 3D Machine Knitting," ACM Transactions on Graphics, vol. 35, No. 4, pp. 1-11 (2016).
Narayanan et al., "Automatic machine knitting of 3D meshes," ACM Transactions on Graphics, vol. 37, No. 3, pp. 1-15 (2018).
Lin et al., "Efficient transfer planning for flat knitting," in: Proc. 2nd ACM Symposium on Computational Fabrication, vol. 5, pp. 1-7 (2018).
Commonly-Assigned, Co-pending U.S. Appl. No. 17/710,915 for "Modular Tool for Design of Self-Folding Knit Fabrics," (Unpublished, filed Mar. 31, 2022).
Vittal et al., "Digital fabrication of textiles: an analysis of electrical networks in 3D knitted functional fabrics," Proc. SPIE, Micro- and Nanotechnology Sensors, Systems, and Applications IX, pp. 1-18 (May 18, 2017).

(56) References Cited

OTHER PUBLICATIONS

Levitt et al., "Investigation of nanoyarn preparation by modified electrospinning setup," Journal of Applied Polymer Science, pp. 1-8 (2017).
Vallett et al., "Development of a Carbon Fiber Knitted Capacitive Touch Sensor," MRS Advances, pp. 1-11 (2016).
Knittel et al., "Self-Folding Textiles through Manipulation of Knit Stitch Architecture," Fibers, vol. 3, pp. 1-13 (2015).
Witkin et al., "Energy Constraints on Parameterized Models," SIGGRAPH '87: Proceedings of the 14th annual conference on Computer graphics and interactive techniques, pp. 1-7 (1987).
Kaldor et al., "Efficient Yarn-based Cloth with Adaptive Contact Linearization," ACM Transactions on Graphics, vol. 29, Issue 4, pp. 1-10 (Jul. 2010).
Kaldor et al., "Simulating Knitted Cloth at the Yarn Level," In Proceedings of SIGGRAPH 2008, pp. 1-9 (2008).
Kuiwu et al., "Knittable Stitch Meshes," ACM Trans. Graph, vol. 38, No. 1, pp. 1-9 (Jan. 2019).
Leaf et al., "Interactive Design of Periodic Yarn-Level Cloth Patterns," ACM Trans. Graph., vol. 37, No. 6, pp. 1-15 (Nov. 2018).
Liu et al., "A Computational Approach to Model Interfacial Effects on the Mechanical Behavior of Knitted Textiles," Journal of Applied Mechanics, vol. 85, pp. 1-12 (Apr. 2018).
Poincloux et al., "Geometry and Elasticity of a Knitted Fabric," Physical Review X, vol. 8, pp. 1-14 (2018).
Cirio et al., "Yarn-Level Cloth Simulation with Sliding Persistent Contacts," In IEEE Transactions on Visualization and Computer Graphics, vol. 23, No. 2, pp. 1152-1162 (Feb. 2017).
Guo et al., "Modelling and Simulation of Weft Knitted Fabric Based on Ball B-Spline Curves and Hooke's Law," 2015 International Conference on Cyberworlds, IEEE, pp. 1-4 (2015).
Jevsnik et al., "Review of Computer Models for Fabric Simulation," Tekstilec, pp. 1-16 (2014).
Lin et al., "Automated geometric modelling of textile structures," https://doi.org/10.1177/0040517511418562, vol. 82, Issue 16, pp. 1-25 (2012).
Yuksel et al., "Stitch Meshes for Modeling Knitted Clothing with Yarn-level Detail," ACM TOG, vol. 31, No. 3, SIGGRAPH 2012, pp. 1-12 (2012).
Grishanov et al., "Advances in the CAD Simulation of Textile Yarns," RJTA, vol. 15, No. 1, pp. 1-10 (2011).
Long et al., "Cloth Modeling and Simulation: A Literature Survey," Digital Human Modeling, HCII 2011, LNCS 6777, pp. 1-9 (2011).
Grishanov et al., "A Topological Study of Textile Structures. Part I: An Introduction to Topological Methods," Textile Research Journal, vol. 79, No. 702, pp. 1-14 (2009).
Grishanov et al., "A Topographical Study of Textile Structures. Part II: Topological Invariants in Application to Textile Structures," Textile Research Journal, vol. 79, No. 822, pp. 1-17 (2009).
Igarashi et al., "Knitty: 3D Modeling of Knitted Animals with a Production Assistant Interface," Eurographics 2008, pp. 1-4 (2008).
Igarashi et al., "Knitting a 3D Model," Pacific Graphics 2008, vol. 27, No. 7, pp. 1-7 (2008).
Kyosev et al., "3D Modelling of Plain Weft Knitted Structures of Compressible Yarn," RJTA, vol. 9, No. 1, pp. 1-11 (2005).
Lomov et al., "Hierarchy of Textile Structures and Architecture of Fabric Geometric Models," Textile Research Journal, vol. 71, No. 6, pp. 534-543 (2001).
Matsumoto et al., "Smectic pores and defect cores," Interface Focus, vol. 2, pp. 1-6 (2012).
Sherburn, "Geometric and Mechanical Modelling of Textiles," University of Nottingham, pp. 1-272 (2007).
Kamien, "Decomposition of the Height Function of Scherk's First Surface," arXiv:math-ph/0008039v3, pp. 1-5 (Dec. 22, 2000).
Meibner et al., "The Art of Knitted Fabrics, Realistic & Physically Based Modelling of Knitted Patterns," Eurographics, vol. 17, No. 3, pp. 1-8 (1998).
Kurbak et al., "Basic Studies for Modeling Complex Weft Knitted Fabric Structures Part I: A Geometrical Model for Widthwise Curlings of Plain Knitted Fabrics," Textile Research Journal, vol. 78, No. 3, pp. 1-11 (2008).
Notification of Transmittal of the International Search Report and the Written Opinion of the International Searching Authority, or the Declaration for International Application Serial No. PCT/US2019/022733 (dated May 29, 2019).
Roach et al., "Progress in superhydrophobic surface development," Soft Matter, pp. 224-240 (Jan. 2008).

* cited by examiner

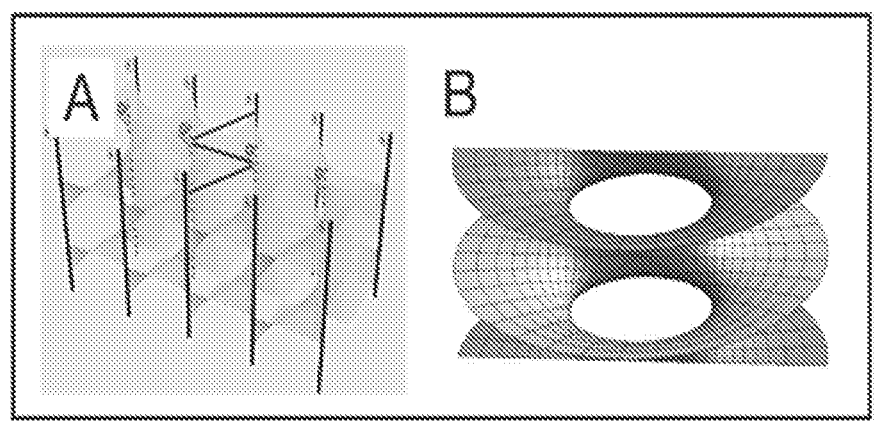
*FIG. 2A*  *FIG. 2B*

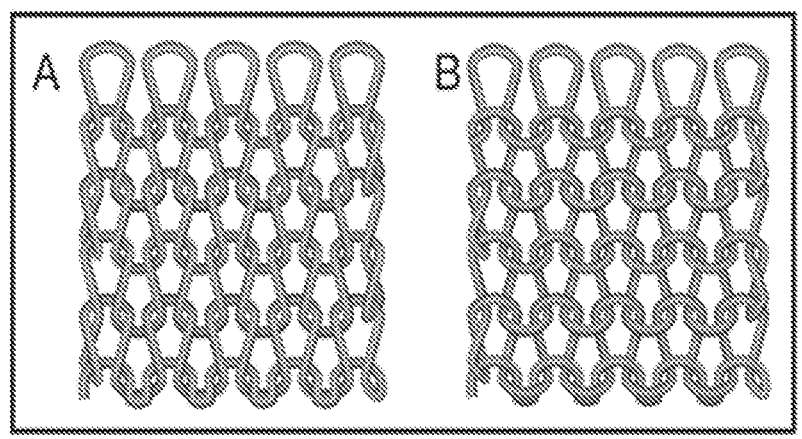
*FIG. 3A*  *FIG. 3B*

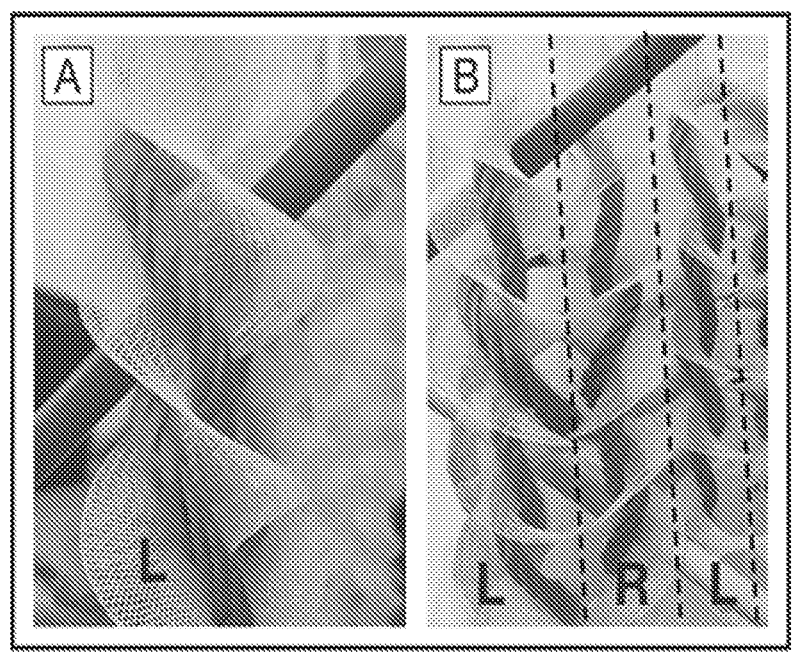
*FIG. 8A*  *FIG. 8B*

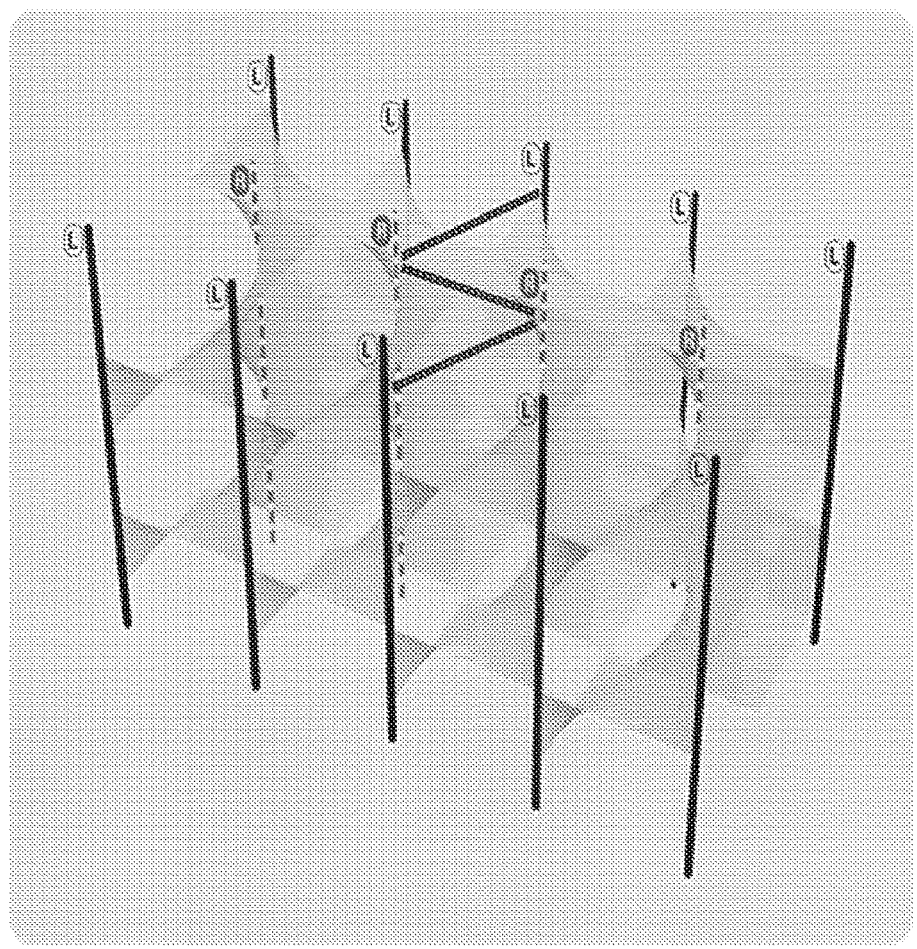
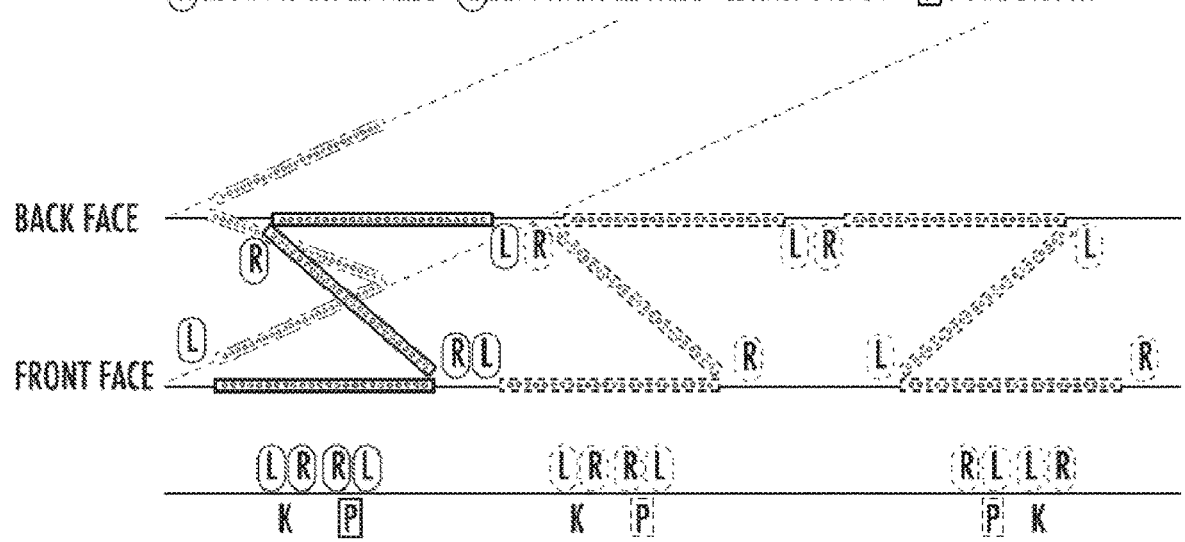
FIG. 8C

TOPOLOGY OPTIMIZATION FOR MODELING AND PREDICTION OF COMPLEX FABRIC STRUCTURES AND PROPERTIES

PRIORITY CLAIM

This application claims the priority benefit of U.S. Provisional Patent Application Ser. No. 62/644,397, filed Mar. 17, 2018, the disclosure of which is incorporated herein by reference in its entirety.

GOVERNMENT INTEREST

This invention was made with government support under Grant Nos. EFRI-1331583 and 1537720 awarded by the National Science Foundation. The government has certain rights in the invention.

TECHNICAL FIELD

The subject matter described herein relates modeling fabric structures. More particularly, the subject matter described herein relates to modeling fabric structures using bicontinuous surfaces.

BACKGROUND

Modern manufacturing typically involves computer aided design and modeling, followed by prototyping and then large scale production. For example, computer programs, such as AutoCAD and SolidWorks allow products to be designed in a virtual environment before manufacturing begins. Similarly, in electronics design, software exits to allow component layout and electrical simulation before producing integrated circuits, circuit boards, and products involving analog and digital circuit elements. SPICE is an example of a tool that allows simulation of electrical components. Cadence is an example of software that is widely used for very large scale integration (VLSI) design.

While software exists and is widely used for mechanical and electrical design, textile products are often manufactured without the benefit of advanced modeling and simulation techniques. Knitted products may be manufactured on a trial and error basis by manufacturing products, testing properties of the products, changing the design, and then remanufacturing the products. Such a trial and error approach is inefficient and can result in suboptimal product designs.

Modeling techniques exist for textile products. However, existing modeling techniques are not physics-based and do not provide a framework for modeling knitted products. Accordingly, there exists a need for improved methods and systems for modeling textile products that avoid the difficulties of trial and error approaches and that incorporate principles of physics into textile product design.

SUMMARY

The subject matter described herein includes a prototype, which is a physical representation of a proposed virtual system that can be used to model and optimize all forms of textile structures and combinations fabricated with yarn. The framework is a platform for representing textile architecture in multidimensional spatial scaffoldings. The conformable membrane can be used to inform textile and composite fabrication of all types, from handmade textile methods to advanced manufacturing processes, including but not limited to textile production machinery and forms of fabrication such as 3D printing and alternative multi-axial fabrication.

This framework will facilitate global optimization and precision manufacturing of textiles. The novelty of this platform stems from the use of bicontinuous surfaces describing spatial relationships of fabrication pathways not only for existing textile structures, but also to inform the development of novel textile architectures.

This framework facilitates shape finding and yarn pathways for the formation of complex intermeshed or interlooped structures along bicontinuous surfaces that inform textile topology. The adaptive mesh created with bicontinuous minimal surfaces can be locally adjusted and used to calculate bending, curvature and stretching of an individual yarn. We are utilizing the well-studied field of bicontinuous surfaces to create an adaptive geometrical mesh that will provide yarn pathway models for textile fabrication. In doing so the bicontinuous surface can take on the parameters of desired textile forms and the user can understand material opportunities or constraints. Our system provides a unique benefit in that the shape of the loop does not need to be defined. Instead it is automatically defined by the helicoid lattice and the chosen topology (i.e. the chosen stitch pattern). Therefore, a change in stitch pattern necessarily results in an appropriate change in the loop shape and relationship to neighboring loops, to maintain the distinct yarn paths on separate sides of the lattice.

The resulting textile model takes into consideration boundary conditions of the material, fabrication process, yarn relaxation and yarn size, resulting in an accurate virtual representation of a desired textile. Currently no such modeling tool exists that can be used to model end-to-end parameters from yarn to prototype for all current textile structures, taking into account boundary conditions (such as bind off, cast on, etc.) and fabric relaxation behaviors.

According to one aspect of the subject matter described herein, a method for modeling textile structures using bicontinuous surfaces is provided. The method includes selecting a virtual scaffold of bicontinuous surfaces defining textile fabrication pathways, to model spatial relationships between the pathways and yarns in a desired yarn pattern of a textile fabric design. The method further includes constructing a yarn pathway across the bicontinuous surfaces that form the virtual scaffold. The method further includes removing or releasing tension from the virtual scaffold, thereby allowing yarns to relax and determining a physical property of the textile fabric design.

According to another aspect of the subject matter described herein, a system for modeling textile structures using bicontinuous surfaces is provided. The system includes a virtual scaffold generator for allowing selection of a virtual scaffold of bicontinuous surfaces defining textile fabrication pathways to model spatial relationships between the pathways and the yarns in a desired yarn pattern of a textile fabric design and constructing a yarn pathway across the bicontinuous surfaces that form the virtual scaffold. The system further includes a fabric properties modeler for removing or releasing tension from the virtual scaffold, thereby allowing the yarns to relax, and determining a physical property of the textile fabric design.

The subject matter described herein for modeling textile structures using bicontinuous surfaces may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 2A is a diagram of an extended lattice structure of a pair of helicoids;

FIG. 2B is a diagram of a unit cell of a bicontinuous helicoid lattice;

FIG. 3A is a diagram of a front view of a simulated weft knit structure;

FIG. 3B is a diagram of a back view of a simulated weft knit structure;

FIG. 8A is a side view of a single stitch on a modeled physical helicoid lattice;

FIG. 8B is a view of three stitches on a modeled physical helicoid lattice;

FIG. 8C is a diagram of the use of helicoid pairs to model handedness of yarn paths and stitches in a knit fabric;

DETAILED DESCRIPTION

Figure 1C:
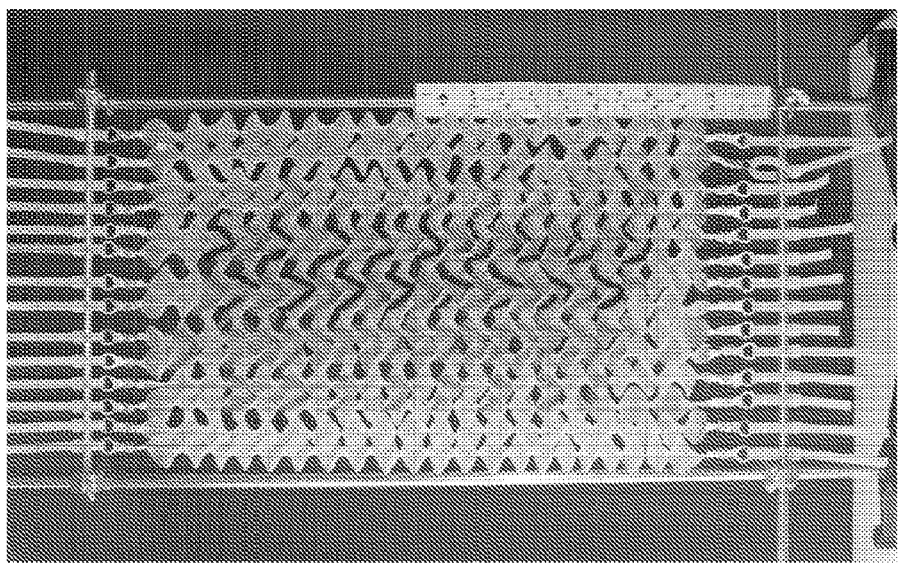
FIG. 1C is a front view of a warp knit structure on the physical model of the bicontinuous helicoid lattice of FIG. 1A.

Modeling and design tools are used across a wide range of industries to enable precision manufacturing of products, as well as expedite the development stages of product design. While these tools have become ubiquitous in many industries, there is still a significant lack of advanced manufacturing techniques available for design and manufacture of textiles. There exists little support for accurate and rapid prototyping of fabrics, both in traditional and novel applications, such as smart textile research and development. While a number of yarns with novel properties, such as high conductivity, are already on the market, currently no software or method exists to help predict the electrical properties of the resulting textile. Even modeling of the effects of yarn relaxation on the topology of textile structures made with conventional yarns is lacking in textile modeling software. This leads to wasted materials and time, as products must be designed largely through trial and error. To address this, we have developed a platform for the development of physics based, parameterized modeling platform for textile structures to help overcome current barriers to innovation in the field of smart textiles.

This document describes an adaptive geometrical mesh that provides a topological framework to inform material pathways for modeling textiles made with any material in the form of string, strand(s), thread or yarn(s). We propose a physics based framework for production of textile modeling software and textile modeling software that uses the framework, based on families of bicontinuous surfaces that automatically incorporate yarn pathways and topologies, allowing for local variations in geometry, including any intermeshing and inter-looping techniques that may be used for manufacturing fabrics.

1. Introduction 1.1. Smart Textiles and the Need for Modeling and Prediction

Automatic textile manufacturing techniques, such as knitting and weaving, have been established for over 400 years. Though these technologies have progressed significantly since their initial development, the accompanying modeling and design tools have not reached the level of capability available for other manufacturing techniques such as computer numerical control (CNC) and 3D printing. Instead, textile design and development is largely carried out through trial and error and use of experiential knowledge passed on through practice and word of mouth. While this already produces inefficiencies in traditional textile production, it becomes a substantial barrier to innovation in research and development of smart textiles and garment devices. Smart textiles and garment devices offer potential improvements for many societal challenges such as those found in medical treatment and monitoring, athletics and personal protection equipment. This category of products incorporates developments such as conductive fabrics, fabrics with engineered structures to provide specific properties, and fabrics that incorporate novel materials to provide functions not previously found in textiles, including energy storage, data transfer, optical properties and more. All of this requires approaching the design of these textiles similarly to the way one might design a traditional electronic device, or mechanical structure. This includes fundamental understanding of operating principles including the properties of the incorporated yarn materials and the resulting properties of the textile including mechanical, electronic, optical and thermal properties among others. A parametric system for textile development would help to propel innovation in the field by providing a means for designers and engineers to understand the potential properties of the textile before physical prototyping occurs. This would include effects of fabrics relaxation, yarn properties, yarn twist, manufacturing parameters, and more. In order to accomplish these goals, we must first develop a robust, physics based model that may be translated into a computer program for modelling of textile structures.

1.2. Topological Studies for Modeling of Textiles

The question of how to model and predict textile structures is not a new one and has been explored by numerous authors who seek to find methods of predicting the physical appearance and properties of knit and woven structures. Early explorations began in the 1930s with the work of authors such as Frederick Peirce, who's work entitled "The Geometry of Cloth Structure" [1] sought to develop mathematical descriptions of fabric structures to predict and control their properties, as well as other early authors such as Hotte [2] in 1950 with "An Investigation of Fabric Structure and it's Relation to Certain Physical Properties" and Leaf in 1985 with "A Generalized Model of Plain Woven Fabric" [3] who pursued study of the relationship between fabric structure and physical properties. These authors laid the ground work for further studies on fabric modeling. For comprehensive reviews of the numerous works studying textile structure-property relationships and modeling, the authors refer the reader to review articles by Hu et al. [4], Long et al. [5], and Jevsnik et al. [6] which provide a review of some of the many techniques that have been explored.

Recently, notable advancements were made towards parametric modeling for woven structures by Guest et al. These authors created a system for topology optimization of microstructure materials, including 3D woven lattices, detailed in their work "Permeability Measurement and modeling of topology optimized metallic 3D woven lattices" and in two subsequent related papers [7][8][9]. Using the "Heaviside Projection Method" [10] described in their earlier work for 3D woven materials, they optimized structure topologies with consideration to manufacturability. Using the functions described in reference [10], they predicted the permeability of woven structures, optimizing performance, with minimal effect on other material properties. Later in a paper titled "Topology Optimization for Architected Materials Design" [11], they describe an envisioned parameterized system for design using these topology optimization principles which define the objective function, while taking into consideration manufacturing parameters and mechanical property constraints. As Guest et al. have made notable contributions towards topological optimization of woven structures, the modeling techniques described herein are applied to the modelling of knitted loops, although our methodology could be applied to woven fabrics as well.

A topological approach has also been explored for the knit structure. Authors Grishanov et al. investigated the modeling of textile structures using knot theory. [12][13] They developed a system of classifying multiple fabric structures including weft and warp knits, in addition to woven structure and focused on development of an algorithm that might "enumerate all possible textile structure" which could be used to classify basic knit patterns. They later determined however that due to the nature of knot theory and the system of descriptions it utilizes, this system could not always provide enough differentiation between varying textile structures; some textile structures may fall into the same classification due to identical numbers of crossing points, regardless of the fact that they are completely different structures. [13]

In the industrial sector, some modeling software exists that provide accurate virtual representations of textile structures. These include the Shima Seiki SDS One Apex software and Stoll Pattern Software M1 Plus for weft knit, Texion Software Solutions ProCad Professional Raschel Office for warp knits, and programs such as PixeLoom, Fiberworks PCW and Weave Point for woven fabrics. The Shima software suite also provides simulation capabilities for woven fabrics. Yet, parametric physics-based software for the design of textile structure is not known to exist. While all of these software products can provide accurate representations of the visual appearance of textile structures, they lack the ability to account for the effects of yarn material used, or yarn relaxation effects that cause changes in the dimension of a fabric after manufacture. Therefore, the subject matter described herein incudes a method of physics-based topological textile modeling.

1.3. Topological Modeling Using Families of Bicontinuous Surfaces

The prototype described herein is a physical representation of a proposed virtual system that could be used to model and optimize all forms of yarn based textile structures. It achieves this goal by providing a platform for representing textile architecture in multidimensional spatial scaffoldings. These conformable scaffoldings are machine agnostic and therefore can be used to inform textile and composite fabrication of all types, from handmade textiles to advanced manufacturing processes, including textile production machinery as well as other forms of fabrication such as 3D printing or other forms of multi-axial fabrication.

One aspect of the developed platform lies in the use of bicontinuous surfaces as fabrication pathways for existing textile structures, as well as a means for developing textile architectures. In this way, this framework will facilitate global optimization and precision manufacturing of textiles.

2. Modelling Yarn Pathways on Bicontinuous Surfaces

Figure 1B:
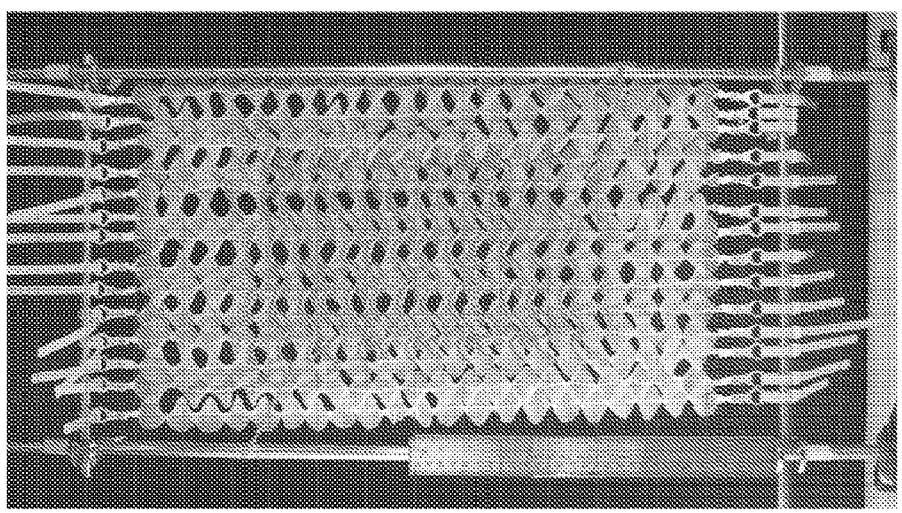
FIG. 1B is a front view of a weft knit structure on the physical model of the bicontinuous helicoid lattice of FIG. 1A.
Figure 1A:
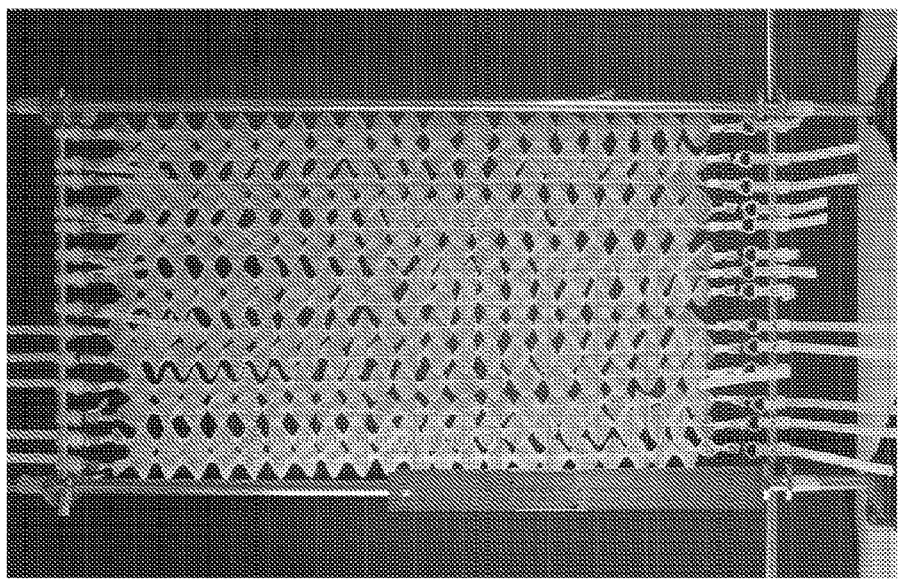
FIG. 1A is a front view of a physical model of a bicontinuous helicoid lattice without a textile structure.

The physical prototype of the proposed virtual system is depicted in FIGS. 1A-1C. FIG. 1A illustrates scaffolding comprising helicoid without a knit structure on the lattice. FIG. 1B is a front view of weft knit yarns extending across the surfaces of the helicoid pairs illustrated in FIG. 1A. FIG. 1C is a front view of a warp knit structure on a helicoid lattice. The scaffolding consists of families of bicontinuous surfaces which provide surfaces on which yarns may lay. The physical model consists of a layer of helicoids, alternating back and forth between a left-hand and right-hand helicoid representing a diagonal cross-section of the mathematical lattice shown in FIG. 1A. The physical model can be grown to a dual layer of helicoids in a checker board arrangement of left-hand and right-hand helicoids, to represent more complex stitch patterns see FIGS. 8C and 8D.

Figure 1D:
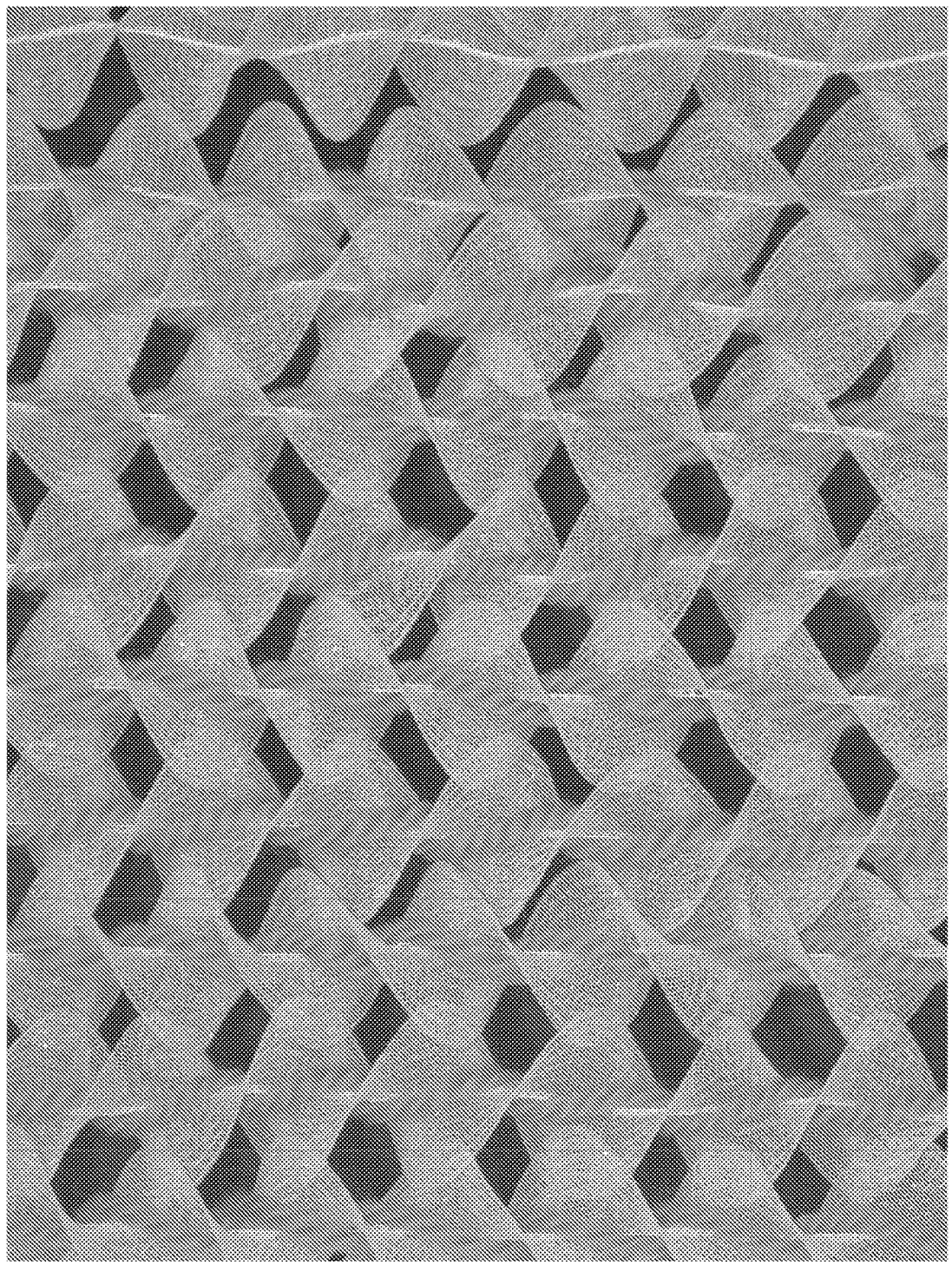
FIG. 1D is a close up front view illustrating the yarn paths of the weft knit structure of FIG. 1B.
Figure 1E:
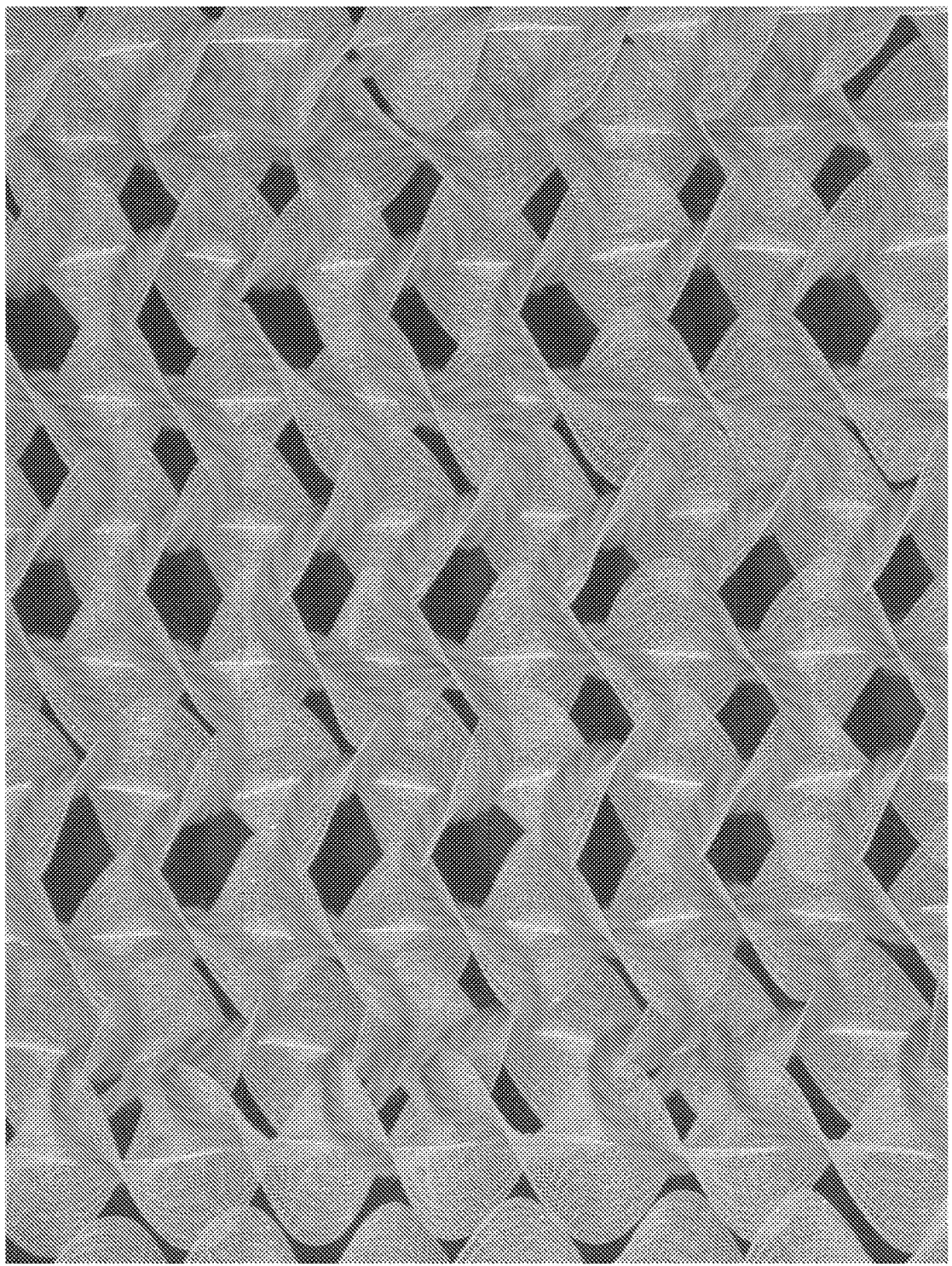
FIG. 1E is a close up back view illustrating the yarn paths of the weft knit structure of FIG. 1B.
Figure 1F:
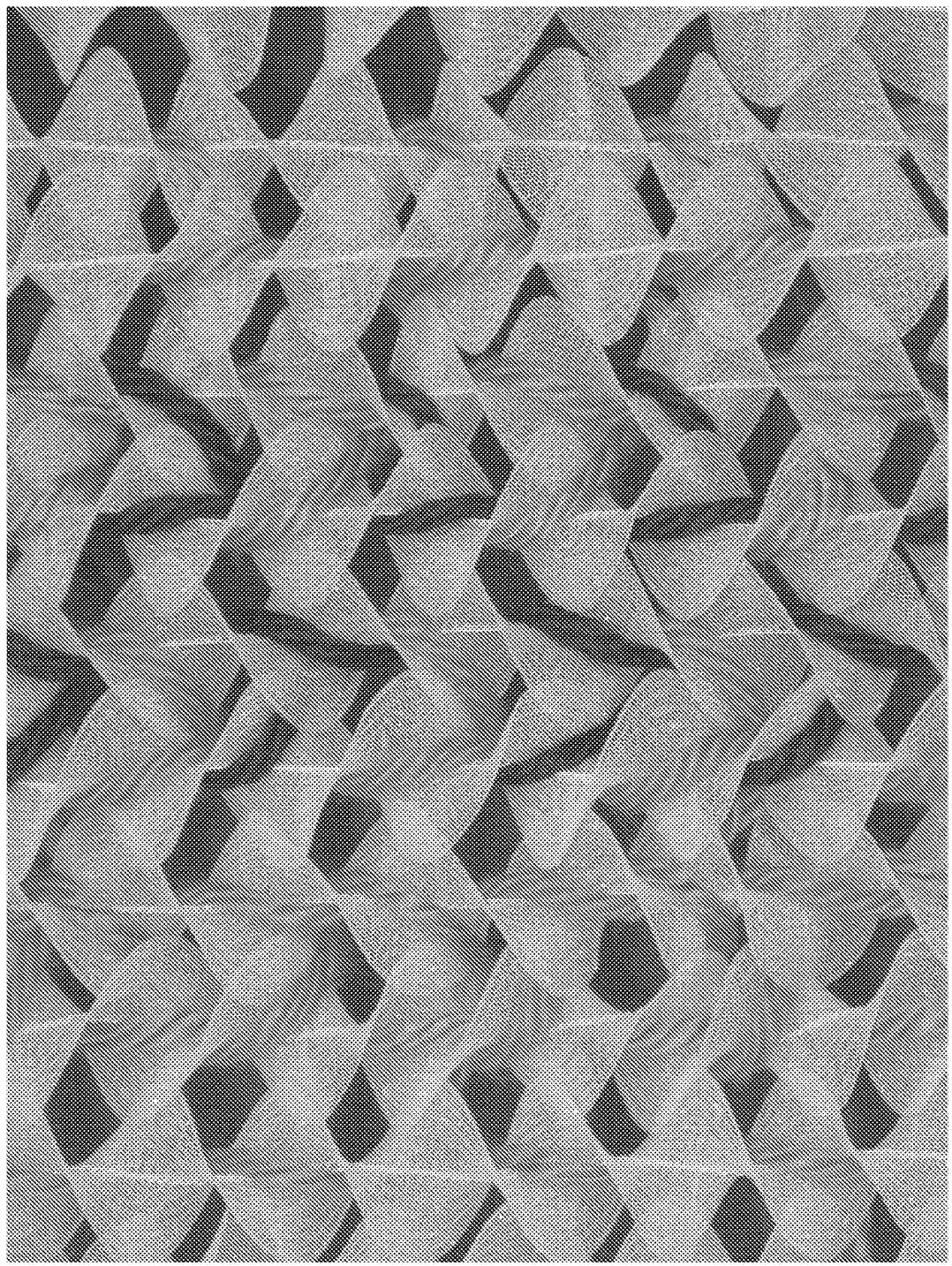
FIG. 1F is a close up front view illustrating the yarn paths of the warp knit structure of FIG. 1C.

FIG. 1D is a close up front view illustrating the yarn paths of the weft knit structure of FIG. 1B. FIG. 1E is a close up back view illustrating the yarn paths of the weft knit structure of FIG. 1B. FIG. 1F is a close up front view illustrating the yarn paths of the warp knit structure of FIG. 1C. In FIGS. 1B-1F, the yarns in the lattice are held under tension by the helicoid pairs on which the yarns are mounted. Each set of helicoid pairs is held under tension by the horizontal rods to which the upper and lower ends of each helicoid pair are attached. The textile is knitted through the helicoids with two extra sets of helicoids without yarn on either side of the fabric. The extra sets are tied with the same tension (the zip ties are all the same size), to show how the yarn controls the behavior of the helicoids. When tension is released from the helicoids, by removing the lower horizontal rod, the fabric relaxes and curls "compressing the helicoids".

Figure 1G:
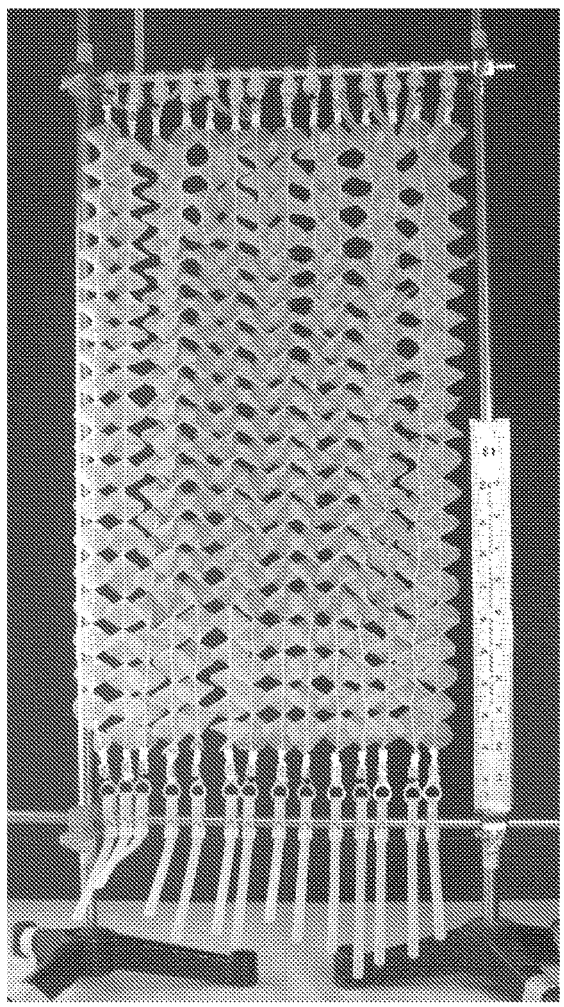
FIG. 1G is a front view of a weft knit structure on helicoid pairs under tension and FIG. 1H is a front view of the weft knit structure of FIG. 1G with the tension released, showing how the fabric relaxes.
Figure 1H:
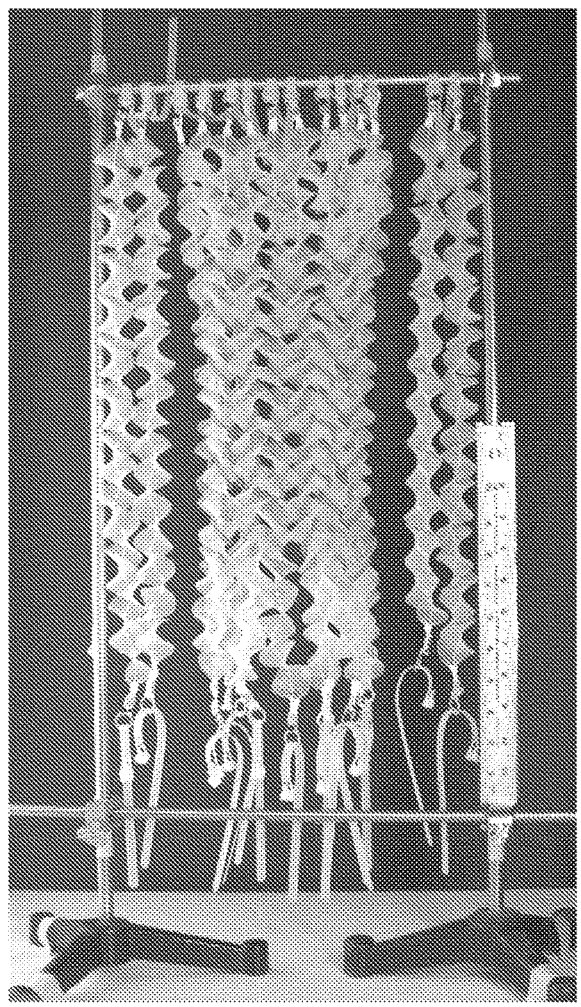

Holding the helicoid pairs and the yarns under tension models' conditions that occur during knitting of a fabric, as yarns are held under tension as they are fed into a knitting machine. When the tension is released, the fabric relaxes, which is how a fabric behaves when it is removed from a knitting machine. FIG. 1G is a front view of a weft knit structure on helicoid pairs under tension and FIG. 1H is a front view of the weft knit structure of FIG. 1G with the tension released. The ruler on the right hand side of FIGS. 1G and 1H is shown to illustrate the amount of relaxation of the fabric structure between the tensioned and relaxed state.

Figure 1I:
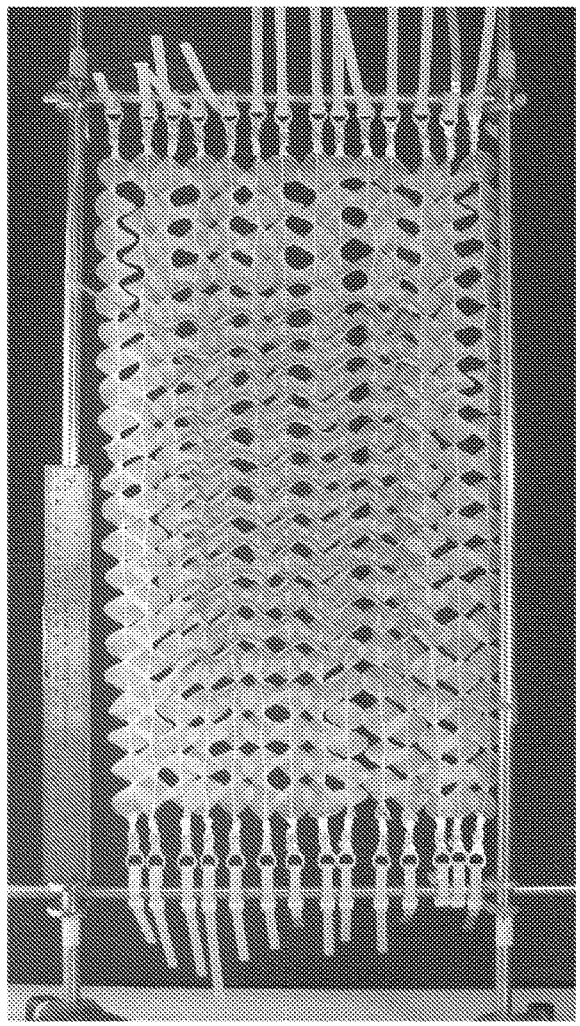
FIG. 1I is a back view of the weft knit structure of FIG. 1G on helicoid pairs under tension and FIG. 1J is a back view of the weft knit structure of FIG. 1G with the tension released, showing how the fabric relaxes.
Figure 1J:
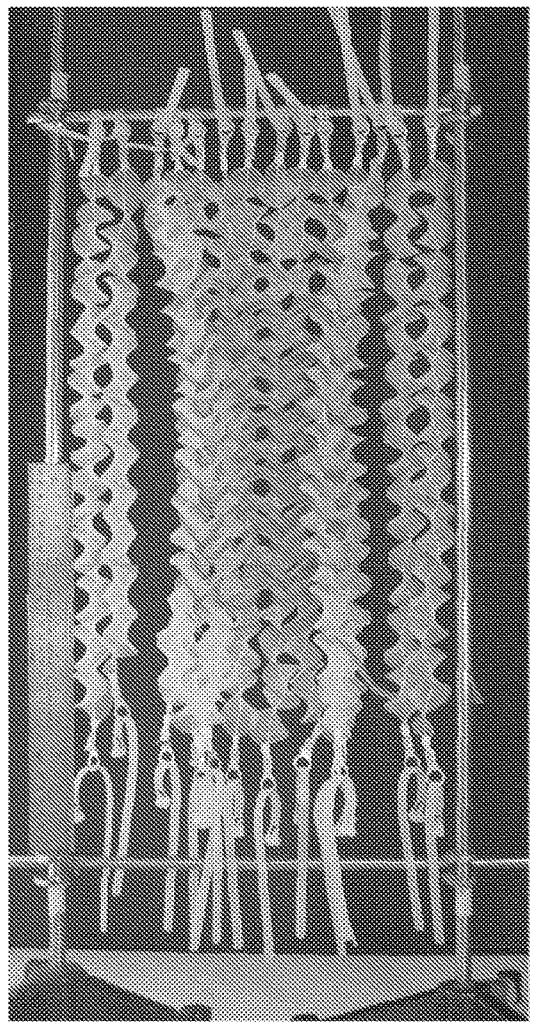

FIG. 1I is a back view of the weft knit structure of FIG. 1G on helicoid pairs under tension and FIG. 1J is a back view of the weft knit structure of FIG. 1G with the tension released.

Figure 1K:
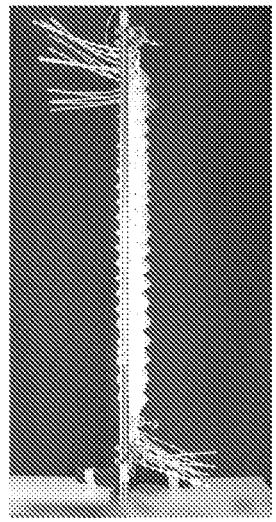
FIG. 1K is a side view of the weft knit structure of FIGS. 1G and/or 1I (front and back of the same structure) under tension.
Figure 1L:
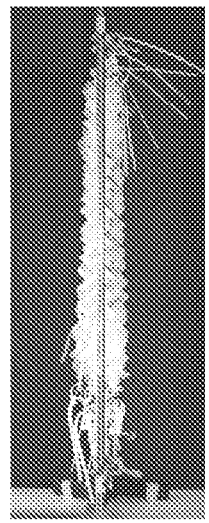
FIG. 1L is a side view of the weft knit structure of FIGS. 1H and/or 1J (front and back of the same structure) with the tension released, showing how the fabric relaxes.
Figure 1M:
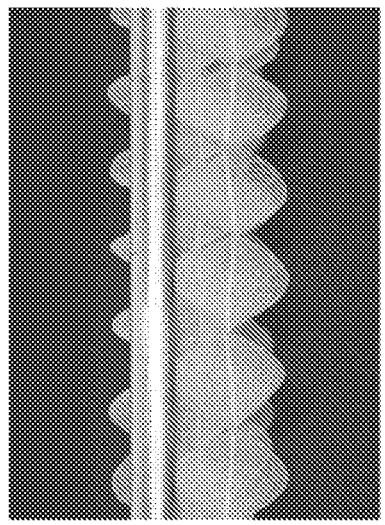
FIG. 1M is a close up side view of the weft knit structure of FIGS. 1G and/or 1I (front and back of the same structure) under tension.
Figure 1N:
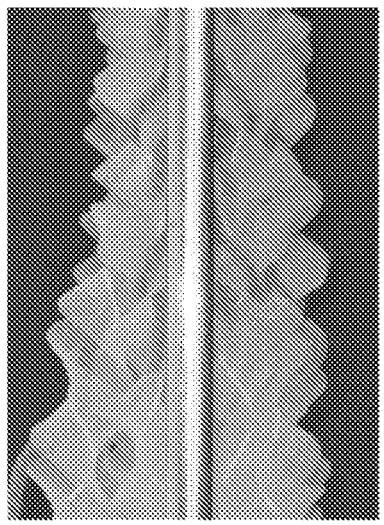
FIG. 1N is a close up side view of the weft knit structure of FIGS. 1H and/or 1J (front and back of the same structure) with the tension released, showing how the fabric relaxes.

FIG. 1K is a side view of the weft knit structure of FIGS. 1G and/or 1I (front and back of the same structure) under tension. FIG. 1L is a side view of the weft knit structure of FIG. 1H and or 1J (front and back of the same structure) in a relaxed state after the tension has been released. FIG. 1M is a close up side view of the weft knit structure of FIGS. 1G and/or 1I (front and back of the same structure) under tension. FIG. 1N is a close up side view of the weft knit structure of FIG. 1H and or 1J (front and back of the same structure) in a relaxed state after tension has been released.

Figure 1O:
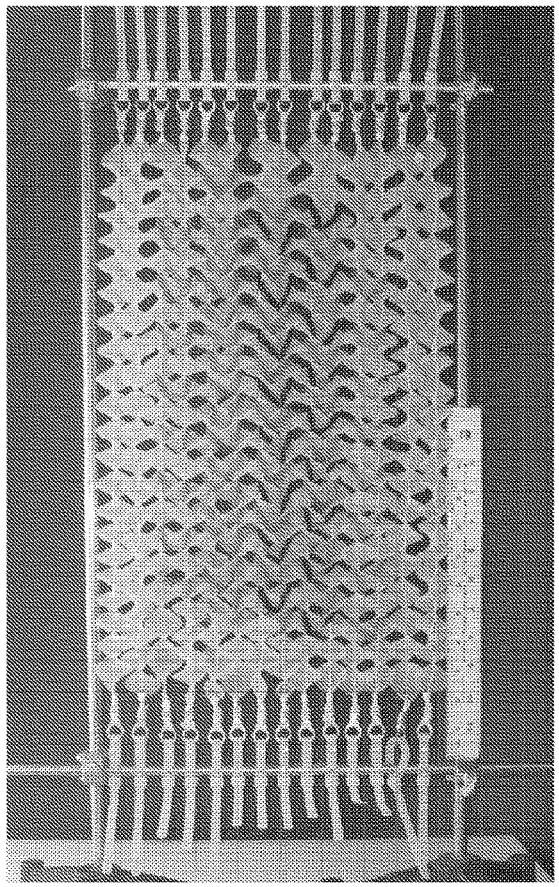
FIG. 1O is a front view of a warp knit structure on helicoid pairs under tension and FIG. 1P is a front view of the warp knit structure of FIG. 1O with the tension released, showing how the fabric relaxes.
Figure 1P:
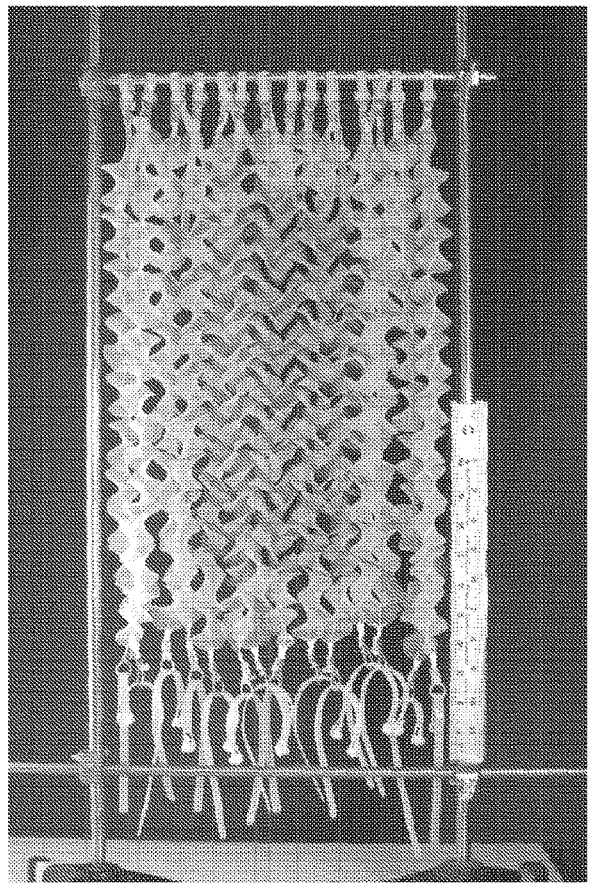
Figure 1Q:
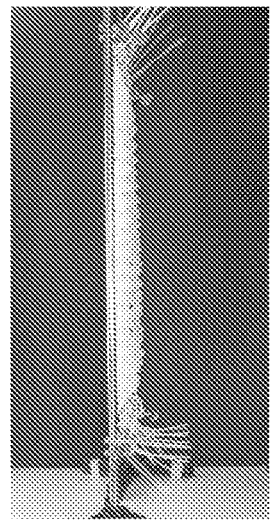
FIG. 1Q is a side view of the warp knit structure of FIG. 1O under tension.
Figure 1R:
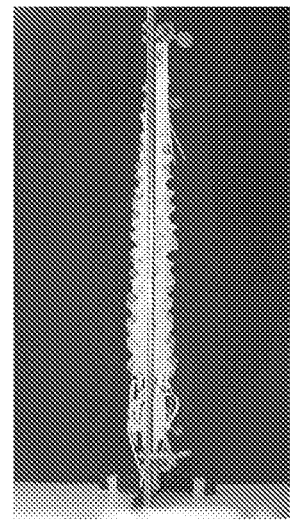
FIG. 1R is a side view of the warp knit structure of FIG. 1O with the tension released, showing how the fabric relaxes.
Figure 1S:
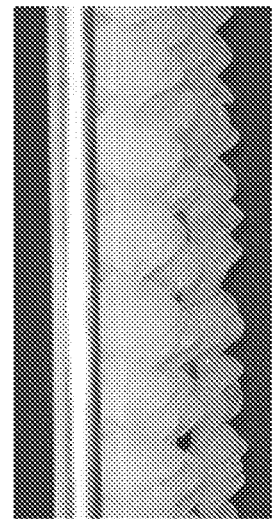
FIG. 1S is a close up side view of the warp knit structure of FIG. 1O under tension.
Figure 1T:
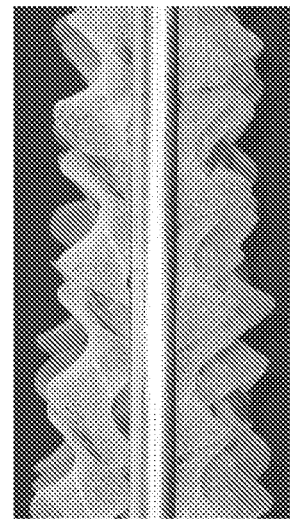
FIG. 1T is a close up side view of the warp knit structure of FIG. 1O with the tension released, showing how the fabric relaxes.

FIG. 1O is a front view of a warp knit structure on helicoid pairs under tension and FIG. 1P is a front view of the warp knit structure of FIG. 1O with the tension released, showing how the fabric relaxes. FIG. 1Q is a side view of the warp knit structure of FIG. 1O under tension. FIG. 1R is a side view of the warp knit structure of FIG. 1O in a relaxed state after the tension has been released. FIG. 1S is a close up side view of the physical model of the warp knit structure of FIG. 1O under tension. FIG. 1T is a close up side view of the warp knit structure of FIG. 1O in a relaxed state after tension has been released.

The removing of the tension from the helicoid pairs releases tension on the yarns, causing the yarns move to a relaxed stated. The relaxation behavior of the fabric on the physical model of the helicoid pairs can be simulated using software using virtual yarns and virtual helicoid pairs. A software implementation of the subject matter described herein will be described below.

FIG. 2B depicts the unit cell of the lattice for a weft knit structure. While in the physical model, the periodicity of these helicoids is fixed, in a virtual model, the periodicity as well as the spacing and width of the helicoids could easily be altered to correspond to various machine gauges and yarn diameters. FIG. 2A illustrates the extended lattice structure. It can be seen from the extended lattice structure in FIG. 2A that helicoids in a pair when placed adjacent to each other form a bicontinuous surface, and, as will be described in detail below, can be used to model spaces between yarns in a knitted structure.

Figure 8D:
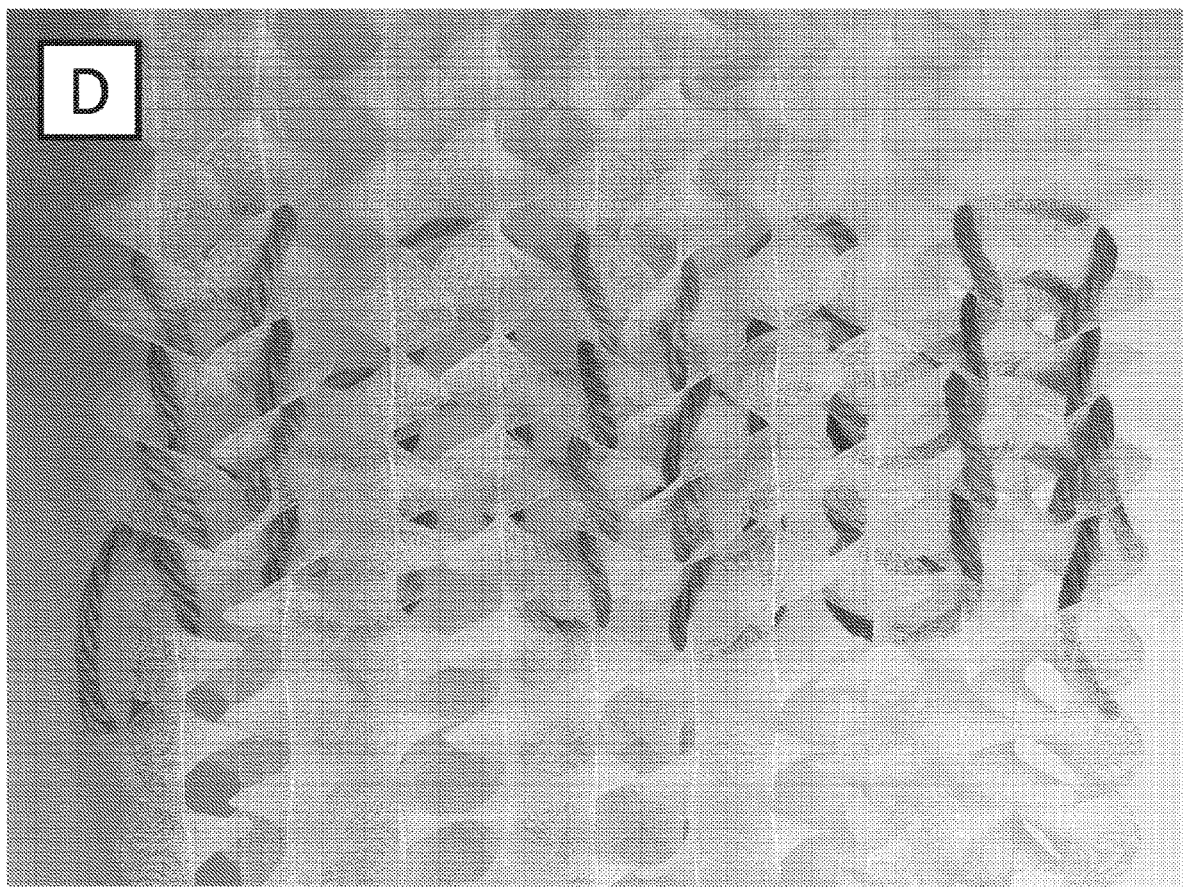
FIG. 8D is a close up view of a dual layer of helicoids in a checker board arrangement of left-hand and right-hand helicoids representing a more complex stitch pattern.

Advantages of this method include its ability to define and design bicontinuous surfaces additively (a method developed by Kamien and co-workers [14][15][16]), which facilitates mathematical modeling of the scaffolding that can subsequently be input into developed software. To illustrate this concept, we consider the weft knit structure, shown in FIGS. 3A and 3B, which uses the stitches knit (K) and purl (P). It is important to note that the knit and purl stitches are the reverse of each other. However, the side from which they are viewed determines their nomenclature in the knit structure. When only one layer of helicoids is represented in the model, it is not possible to have knit and purl stitches on the same side. When the model is grown to a dual layer of helicoids in a checker board arrangement of left-hand and right-hand helicoids, more complex stitch patterns can be represented including knit and purl on the same side of the fabric as shown in FIGS. 8C and 8D. In weft knit designs, the topology of the yarns is fixed. Therefore, a bicontinuous surface is constructed that divides space into two parts and provides the proper topology. Then, we optimize the geometry of the yarns on these surfaces by searching low-dimensional parameter space. This allows for prediction of the resulting relaxed knit geometry.

First, we note the handedness to the way that one strand of yarn goes around the other as the stitches are formed along the course direction. Considered from left to right, a K is constructed from a left twist followed by a right twist, while P is a constructed from a right twist followed by left twist. From this it follows that when the fabric is turned over, or viewed from the back, a K becomes a P, and P becomes a K. To build up a sequence of left and right twists, we can generate a three-dimensional surface constructed from a two-dimensional array of helicoids, either left(L)- or right (R)-handed. Reading from left to right, we can then replace a sequence of Ks and Ps with LR and RL, respectively. For example, the knit pattern "KPPKPP . . . " (knit one, purl two) becomes "LRRLRLLRRLRL . . . " A two dimensional "checkerboard" arrangement of L and R allows us to knit arbitrary structures: switching from K to P requires us to move from one row of the checkerboard to the other, in order to put two Rs or two Ls in a row. Fortunately, helicoids have a natural home in two-dimensions: they are the Riemann surfaces of the complex natural logarithm of $z=x+iy$, $\phi_R(z; z_0)=\ln(z-z_0)$ for R and $\phi_L(z;z_0)=-\ln(z-z_0)$ for helicoids centered at $z_0=x_0+iy_0$. In order to construct a general surface all that is necessary is to sum an arbitrary combination of N Rs and Ls we write the surface as a graph (i.e., in Monge gauge):

$$h(x, y) = \text{Arg}\left[\sum_{n=1}^{N} b_n \phi_{H_n}(x + iy; z_n)\right]$$

where the $n^h$ helicoid has handedness $H_n=R$ or L, is located at $z_n=x_n+iy_n$, and has magnitude $b_n>0$. Arg gives the imaginary part or argument of the complex function. Thus, all together, we can adjust the positions $(x_n,y_n)$ and the periodicity (through b_n(t)) of all the helicoids. For simplicity, we can approximate $b_n$ as a piecewise linear function to account for gradients and changes in pitch. When considering periodic knitting patterns, we will, instead, choose to expand the b_n(t) in the first few Fourier modes. The magnitude controls the periodicity of each separate helicoid. This technique, developed at the University of Pennsylvania, has been used to construct a myriad of complex, bicontinuous surfaces, including "Schnerk's first surface," a surface that is made from a checkerboard array of L and R helicoids. Knitting can then proceed by staying on the first row of LRLRLR until purling is desired, at which point the stitching moves one row back to access RLRLRL and so on. This moving from one row to the other can be done at any point along the course (row) of knitting.

Next, we analytically construct the metric tensor of the surface, $g_{ij}(x,y)=\delta_{ij}+\partial_i h \partial_j h$ from which we can form the geodesic equation: the differential equation that determines the shortest paths along the surface:

$$\frac{d^2 x^k}{dt^2} + \sum_{i,j=1}^{2} \Gamma_{ij}^k \frac{dx^i}{dt} \frac{dx^j}{dt} = 0$$

where $$\Gamma_{ij}^k = \frac{1}{2} g^{km}(\partial_i g_{jm} + \partial_j g_{im} - \partial_m g_{ij})$$

are the Christoffel symbols. We use this to calculate the paths of individual yarns, here using established methods for the solution of linear differential equations. In doing so, we will obtain the three-dimensional path of the yarns that can be used to calculate physical properties of yarns in a fabric, including bending, curving, and stretching of individual yarns. Varying over the parameters allows minimization of the total yarn energy and prediction the finished geometry, which will result in an accurate virtual representation of the desired textile that considers boundary conditions, fabrication processes and yarn size.

Figure 4A:
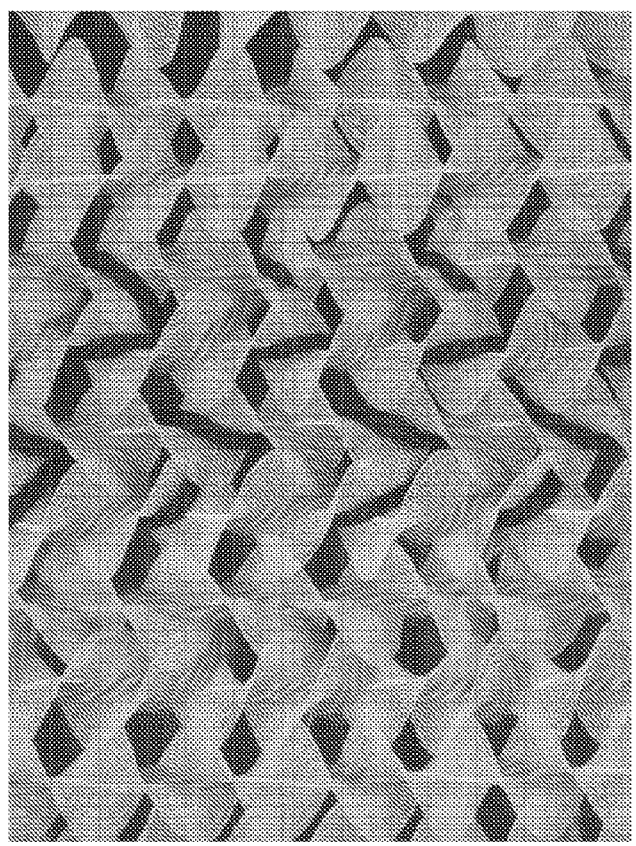
FIG. 4A is a front view of a warp knit structure on a helicoid lattice.
Figure 4B:
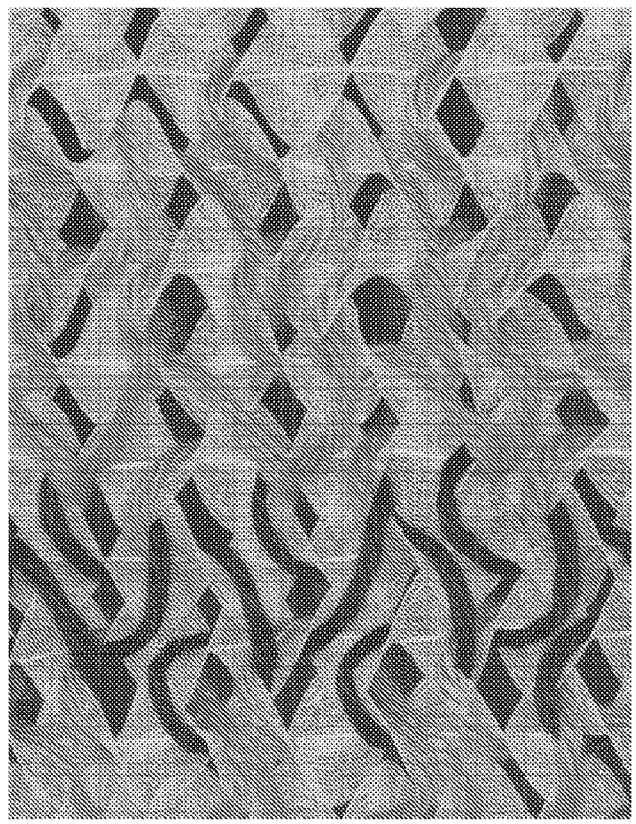
FIG. 4B is a back view of a warp knit structure on a helicoid lattice.

Similarly, the path of the yarn in other textile structures, such as the warp knit can be determined using the appropriate combination of Rs and Ls. FIGS. 4A and 4B demonstrate how the warp knit topology may exist on the same family of bicontinuous surfaces as the weft knit. More particularly, FIG. 4A is front view of a warp knit structure on a helicoid lattice and FIG. 4B illustrates a rearview of the warp knit structure on a helicoid lattice. While variations in perodicity or even different families of surfaces may be required for some textile topologies, this demonstrates how one scaffold may be used for multiple textile architectures.

3. Implications for Manufacturing

The virtual framework described herein can be used as a machine agnostic advanced manufacturing tool, allowing it to be useful for a variety of machines, across various brands and textile structures. Once the spatial scaffolding is defined, the preferential output for the design will be suggested based on the desired material and form of the final product. The platform will be designed to maintain a repository of design and performance data. This data will then be used to develop industry standards for all yarns through implementation of validation testing. While the initial framework applies specifically to current manufacturing it is anticipated that this platform may be used for the development of novel textile manufacturing methods.

A software system based on this concept could benefit a wide variety of industries including advanced manufacturing, textile manufacturing, biomedical device manufacture, and the associated research and development teams, as well as smaller groups or individuals such as designers, academics, architects, crafters, and maker movement participants, through the following means:

- Bringing of new understanding to how textiles behave globally through families of bicontinuous surfaces.
- Facilitation of rapid prototyping of textiles through accurate simulation of fabric behavior.
- Support for low volume manufacturing or mass-customization as changes to textiles can now be studied and analyzed in a virtual model.
- Providing of new understanding of textile fabrication processes.
- Informing development of new machinery and equipment to produce previously unimagined textile forms.
- Generation of a cross-examining modeling language for creators to actively and continuously synthesize visionary concepts with built-in fabrication conditions to deliver informed designs.
- Enablement of virtual application of new/existing materials allowing for textile innovation in the modeling and prototyping phases.
- Informing of standards to support manufacturing process improvements. This platform will maintain a repository of design and performance data and conduct validation testing to develop industry standards for all yarns (including but not limited to filament, staple, wire, braided, plied, corded) of any size or material.

4. Implications for Prediction of Textile Properties

Figure 5C:
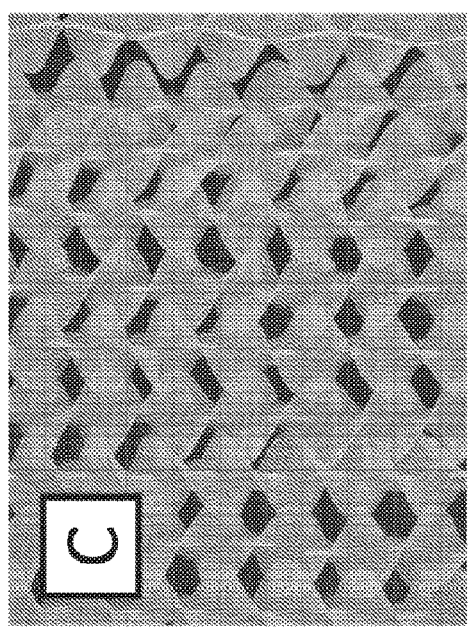
FIG. 5C is a front view weft knit jersey fabric on a scaffold of bicontinuous surfaces formed of helicoid pairs.
Figure 5D:
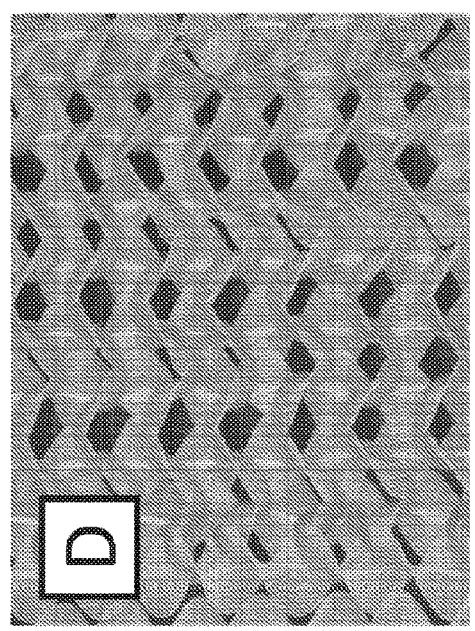
FIG. 5D is a diagram of a back view weft knit jersey fabric on a scaffold of bicontinuous surfaces formed of helicoid pairs.
Figure 5A:
FIG. 5A is an image of a front view of a weft knit jersey fabric.
Figure 5B:
FIG. 5B is an image of a back view of a weft knit jersey fabric.
Figure 6:
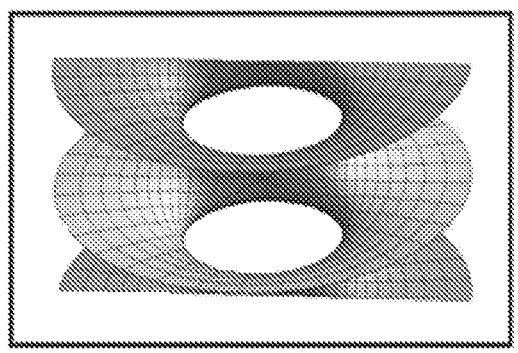
FIG. 6 is a diagram of a unit cell of a helicoid structure.
Figure 7:
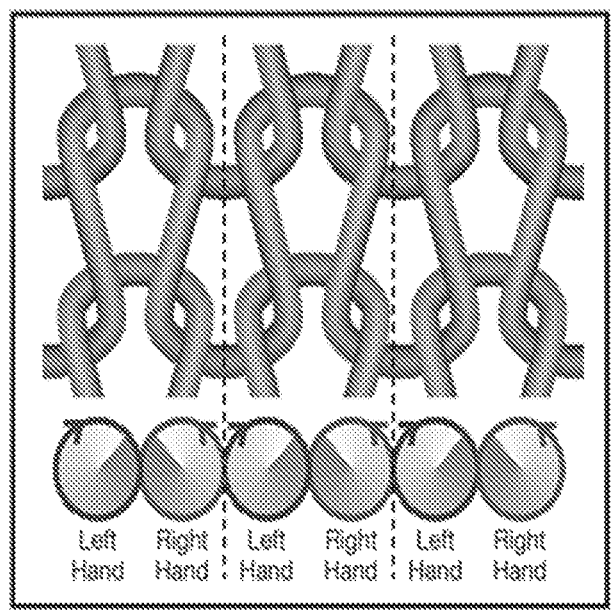
FIG. 7 is a diagram illustrating the correlation of three knit stitches to their corresponding helicoids in a lattice.

Our developed platform will help bring new understanding to how textiles behave globally though families of bicontinuous surfaces, which will facilitate physical understanding of the behaviors through mathematical representation of the topologies. By observing the topology of the weft knit structure on the bicontinuous surface scaffolding, we can demonstrate how this platform will begin to predict behaviors of specific textile structures, such as effects of yarn relaxation. For example, again considering the weft knit structure: jersey knit is a structure consisting of entirely knit stitches. Shown in FIGS. 5A-5D is a physical weft knit jersey fabric (FIGS. 5A and 5B) and the yarn path of the jersey fabric on the bicontinuous scaffold (FIGS. 5C and 5D). As can be seen in FIGS. 5A and 5B, a jersey knit fabric, when allowed to relax normally, will curl towards the back at the side edges, and towards the front at the top and bottom edges. This behavior affects subsequent manufacturing steps such as cutting and seaming but can also be utilized to benefit in certain product designs or knit patterns, where this intrinsic property may drive more complex folding and rolling behaviors in the fabric. Looking back at the bicontinuous scaffolding, we can observe how this structure helps to explain this curling phenomenon that occurs with yarn relaxation seen in FIGS. 1H and 1J. When observing the curling at the side edges of the knit, we can consider how each stitch comprises of 1 left handed helicoid and 1 right handed helicoid, producing a balanced pair. FIG. 6 shows the lattice unit cell for one knit stitch. This stitch is then balanced out on either side by another opposing helicoid. However, at each edge, we are left with a stitch without an opposing helicoid to balance it out, producing curling behavior that follows the direction of the helicoid at each edge. This can be seen in FIG. 7 which depicts a 3-stitch wide structure using just the directions (handedness) of the underlying helical scaffoldings.

In the same way, we can illustrate the top and bottom edge curling effects of weft knit jersey using the lattice structure. Once again, consider FIG. 6, which depicts the unit cell helicoid for one knit stitch as viewed from the front. One can observe two sets of holes in the structure, with the axis of each stitch being a line that moves down through the hole from front to back. FIG. 8A shows the side view of this same unit cell as part of the physical prototype, with this axis depicted. Between any two LR helicoid pairs, such as these shown, we get a hole going down through the structure from top to bottom and between any two RL helicoid pairs, we get a hole going up through the structure from bottom to top. The handedness of a particular helicoid can be determined using the right hand rule. For example, in FIG. 8A, if the fingers of a user's left hand curl in the direction of the yarn across the surface of the helicoid, the user's thumb will point downwards, and this helicoid is thus labeled a left handed helicoid. In FIG. 8B, the center helicoid is labeled a right-handed helicoid because of the right-hand rule. That is, when the fingers of a user's right hand curl in the direction of the yarn across the surface of the helicoid, the user's thumb will point upwards.

The directionality of the holes formed by the helicoid pairs predicts the curling behavior of the jersey knit stitch. If we imagine the axis as a rod moving through the LR pair from the top to them bottom and we consider the positioning of the loops in relation to the rods, we can see that at the top edge of the fabric, the only movement that can occur physically is for the final loop to pull down on the rod without any further loops to pull it up. On the bottom edge, between each RL pair, as we transition from one stitch to the next, here we have an axis moving up from bottom to top and the effect occurs in the opposite direction. Where the yarn bridges the gap between the first and second stitches, the yarn is situated around the axis in such a way that it may only pull it up, shown in FIG. 8B. These initiate the curling movement of the loops which propagates though the material until the two edges meet in the middle, or until an equilibrium is otherwise reached, such as from the effects of friction.

FIG. 8C further illustrates the use of helicoid twist direction to model handedness of yarn paths. In the uppermost portion of FIG. 8C, a three-dimensional scaffold representing a fabric design is shown. The center portion of FIG. 8C is a top view of the scaffold showing left and right-handed helicoids. The lower portion of FIG. 8C illustrates the modeling of knit and purl stitches using pairs of RL or LR helicoids.

Additional Stitches

FIGS. 8E-8J demonstrate the ability to use the virtual framework for modeling additional stitches beyond knit and purl. The stitches shown 8E-8J include the transfer stitch, the tuck stitch and the miss stitch, they are described below. These stitches are integral to the development of complex shaping and are also commonly used to produce variations in the density of textile structures. While these stitches represent a deviation from the plain knit jersey architecture, they do not disrupt the geometry and spacing of the helicoid lattice.

Figure 8E:
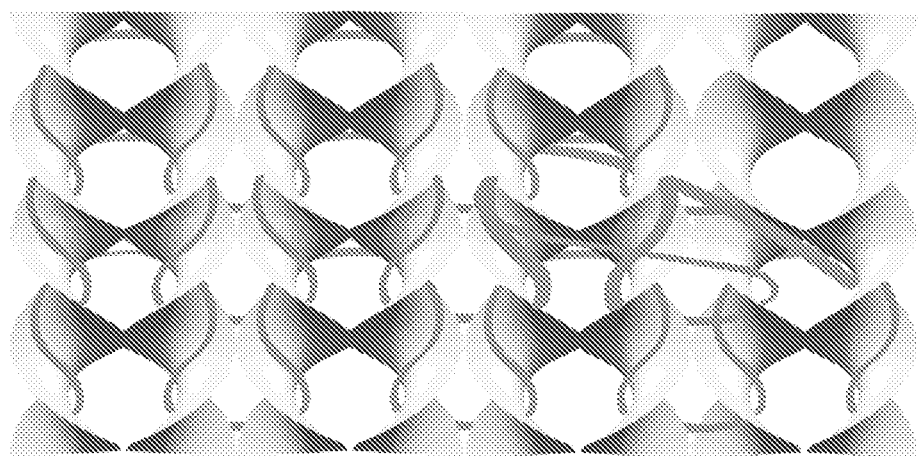
FIG. 8E illustrates a diagrammatic representation of the helicoid lattice, with the yarn path required for a decrease using the transfer stitch.
Figure 8F:
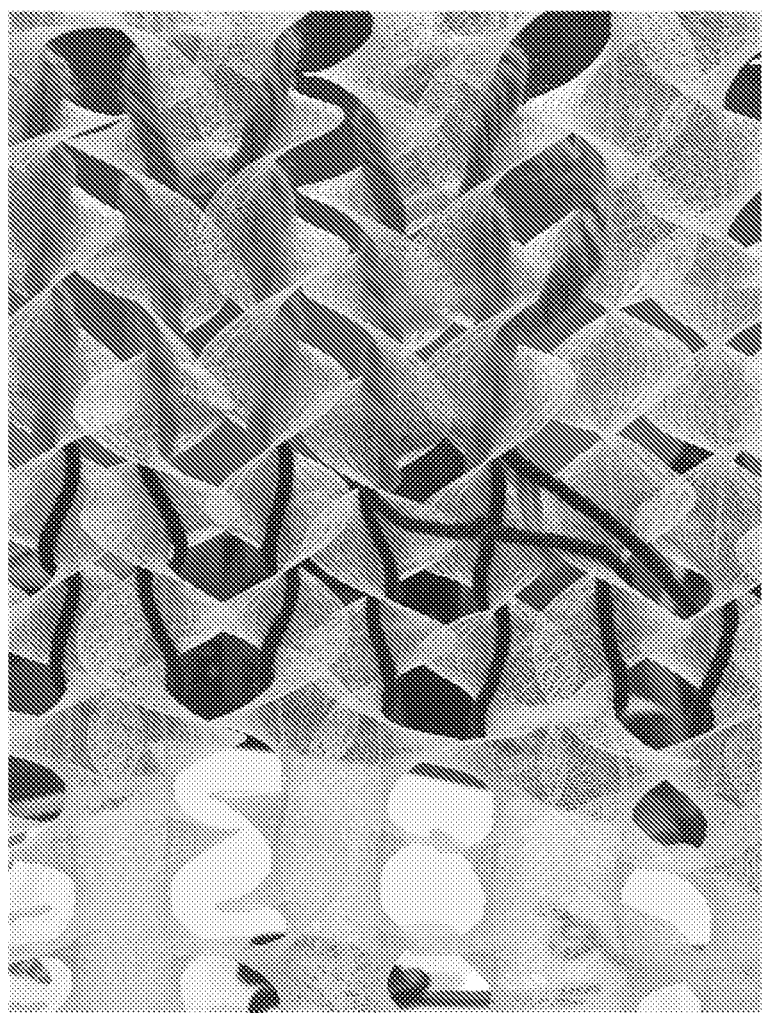
FIG. 8F shows the physical model of the helicoid lattice, with the yarn path required for a decrease using the transfer stitch.

FIGS. 8E and 8F illustrate a transfer stitch typically used to decrease the number of stitches in a weft knit structure, for example from four stitches wide, to three. Here the loop moves to its neighboring helicoid pair (to the right or the left), while remaining on its designated surface on the helicoid lattice, resulting in combining two loops together on that neighboring helicoid pair.

Figure 8H:
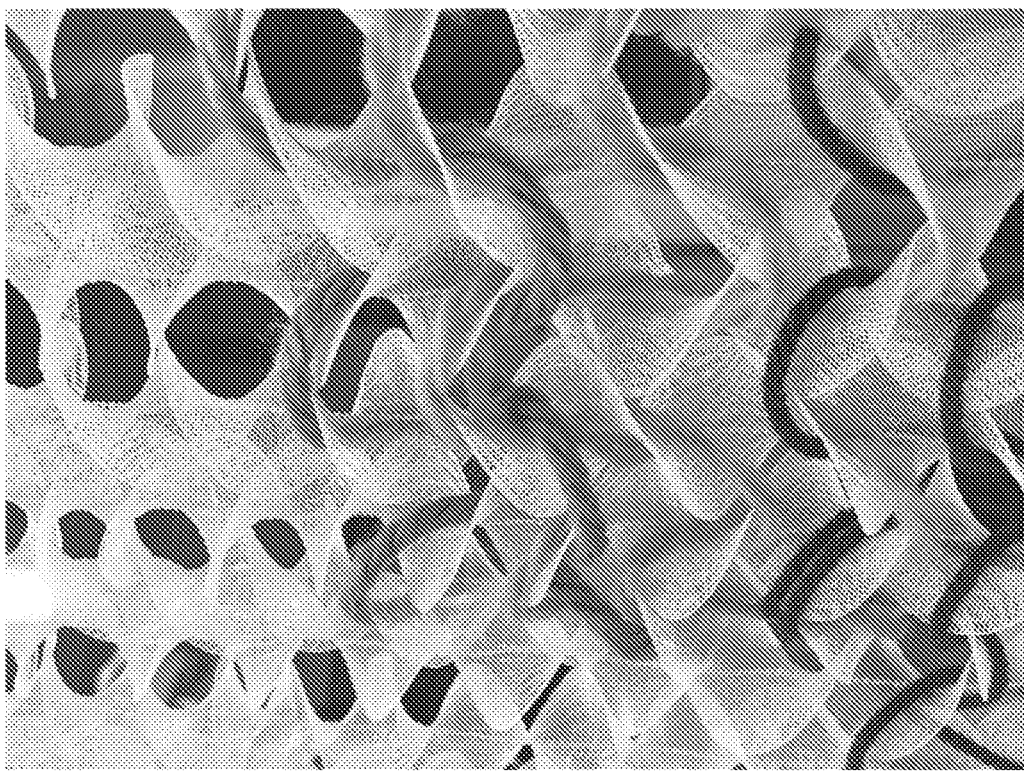
FIGS. 8G and 8H are images of front and rear views of a tuck stitch on a physical model of a helicoid lattice.
Figure 8G:
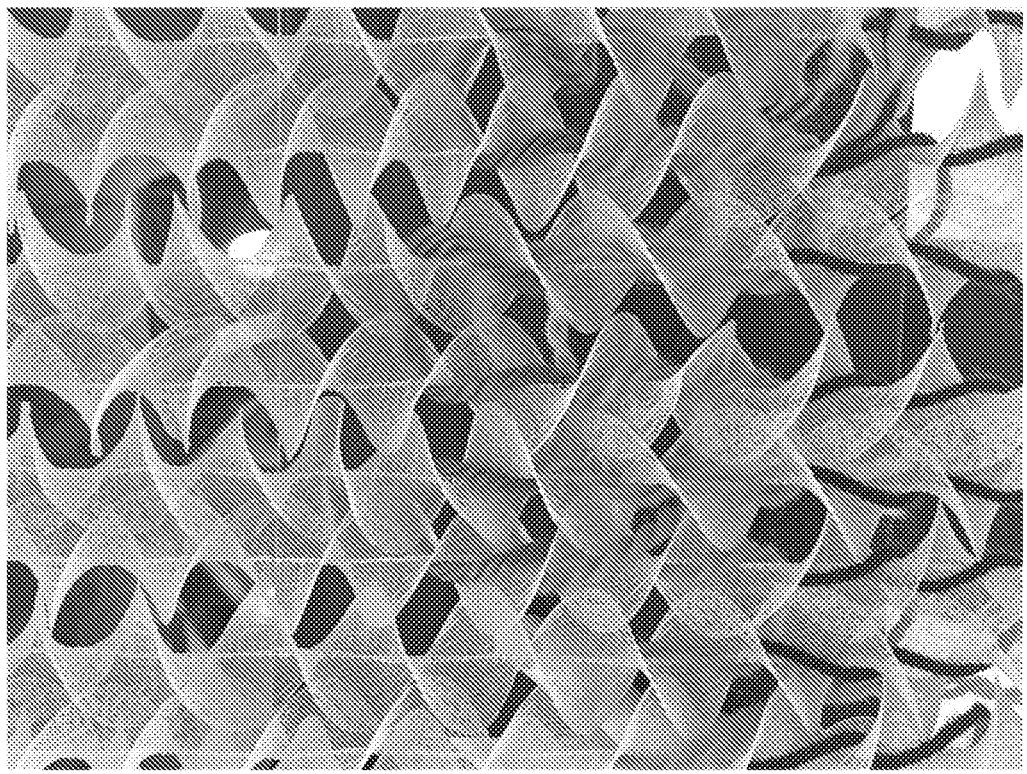

FIGS. 8G and 8H demonstrate the tuck stitch. Here the loop skips a row while remaining on its designated surface on the helicoid lattice, resulting in combining two loops together on the following row. FIG. 8G shows the physical model of the helicoid lattice, with the yarn path required for a tuck stitch, as seen from the front. FIG. 8H shows the physical model of the helicoid lattice, with the yarn path required for a tuck stitch, as seen from the back.

Figure 8I:
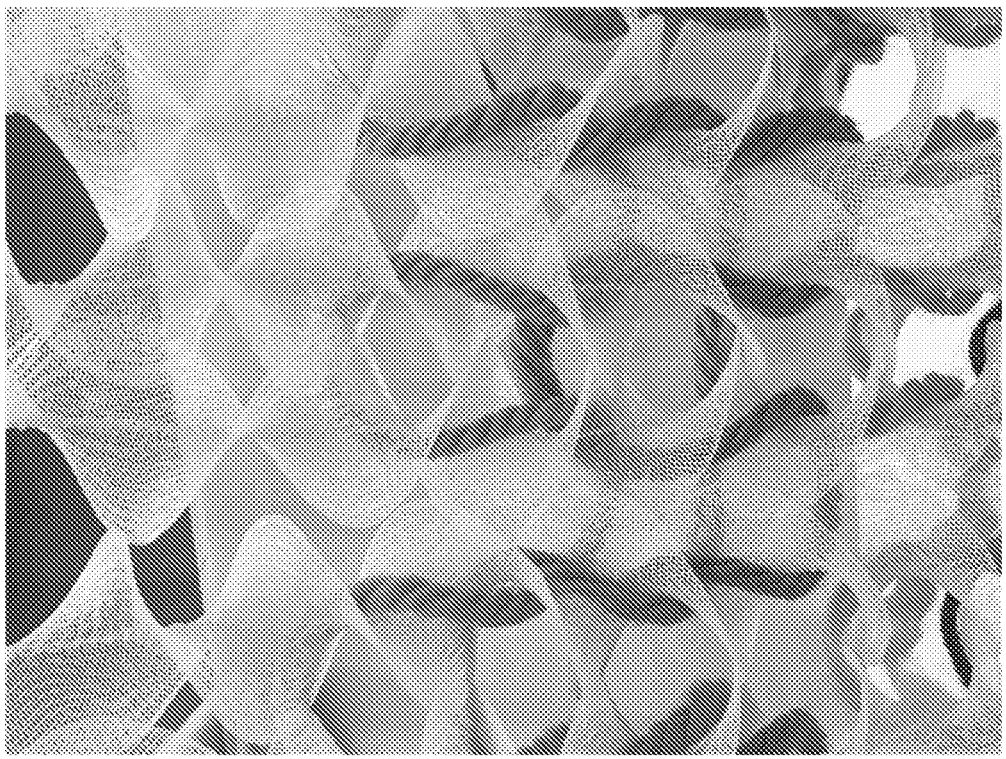
FIGS. 8I and 8J are images of front and rear views of a miss stitch on a physical model of a helicoid lattice.
Figure 8J:
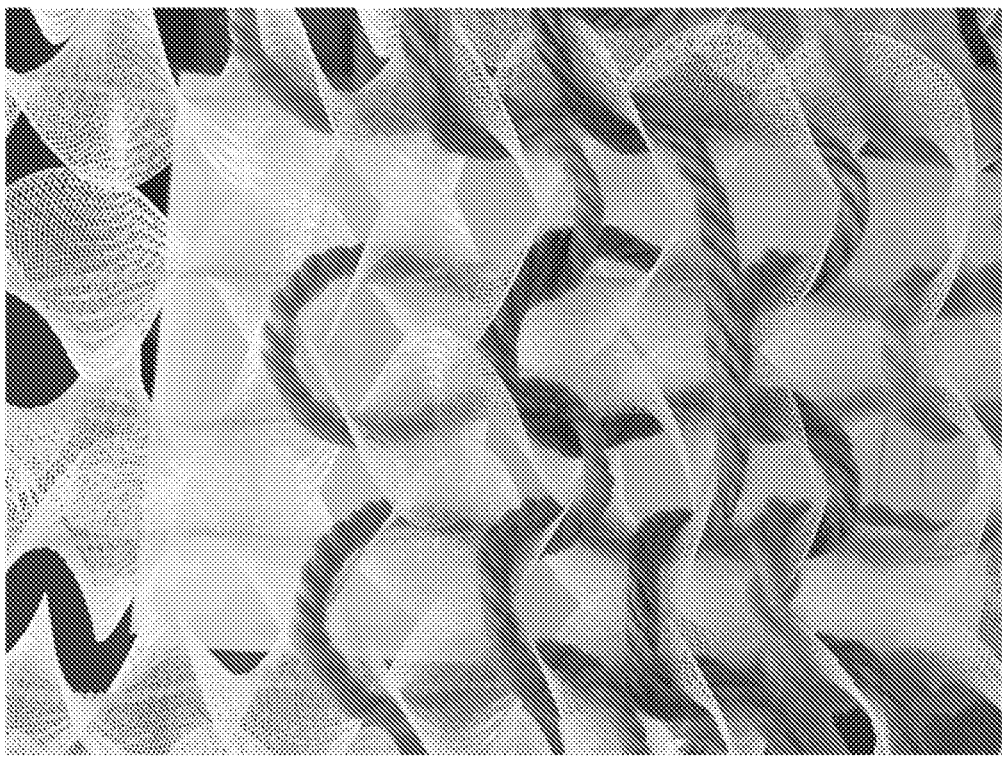

FIGS. 8I and 8J demonstrate a miss stitch. Here the loop skips a helicoid pair while remaining on its designated surface on the helicoid lattice, resulting in an increased distance between two sequential loops. FIG. 8I shows the physical model of the helicoid lattice, with the yarn path required for a miss stitch, as seen from the front. FIG. 8J shows the physical model of the helicoid lattice, with the yarn path required for a miss stitch, as seen from the back.

Digital Implementation

We have developed the mathematics and algorithms needed to produce a digital implementation of the minimal bicontinuous surfaces that may be used as a scaffolding for defining the structure of the yarns in a knitted fabric. We utilize a specific bicontinuous surface called a helicoid. We have reformulated the mathematics of the surface from one that is defined in complex space to a biparametric mapping from polar coordinates into 3D Cartesian coordinates, making the approach more amenable to standard Computer-Aided Design (CAD) systems. Within our software system one may define the parameters of a helicoid and how many and what type of stitches (knit or purl) are desired, and a 3D model of the helicoid scaffoldings are generated with optimized yarns laying on the surfaces in characteristic intertwining knitted structures. Generating the digital helicoid surface is straightforward but computing the correct paths of the fabric's yarns involves solving a set of optimization problems.

While a helicoid can be defined as the Riemann surface of the complex natural logarithm of a complex variable, for the digital implementation we equivalently define it as a biparametric surface in polar coordinates, $(r,\theta)$, $r \in [-R_h, R_h]$, $\theta \in [\theta_0, \theta_1]$. In this formulation a helicoid H centered at the origin and extending along the Z-axis in Cartesian coordinates is defined by the following equation $$H(r,\theta)=[r^*\cos(\theta), r^*\sin(\theta), c^*\theta], \quad (1)$$

where c is a scaling factor that may be used to adjust the height of the helicoid and the spacing between each cycle of the surface. The helicoid's radius is $R_h$.

In order to find an optimal path for the yarn on the helicoid, the minimum distance from each point on the yarn to the helicoid needs to be computed. The yarn path is initially defined as a Catmull-Rom spline. The spline is discretized into a finite number of points; thus approximating the yarn path with a polyline. For each point P we find a point Q on the helicoid that is closest to P. If P lies within the vertical projection of the helicoid the shortest distance to Q is the line that lies along the normal to the helicoid at point Q. A normal to any surface is orthogonal to two tangent vectors lying in the surface. For helicoid surface H, its tangents along the radial and angular directions are given by $\partial H/\partial r$ and $\partial H/\partial \theta$ respectively.

Since the vector $\overrightarrow{QP}=(P-Q)$ is orthogonal to both of these tangents, its dot product with each is zero.

$$(\partial H/\partial r)\cdot(P-Q)=0 \quad (2)$$

$$(\partial H/\partial \theta)\cdot(P-Q)=0 \quad (3)$$

Substituting the equation for the radial tangent vector into the Equation 2 and simplifying produces $$r=P_x\cos(\theta)+P_y\sin(\theta). \quad (4)$$

Similarly, substituting the angular tangent vector into Equation 3 and simplifying produces $$(P_y^2-P_x^2)/2 \cdot \sin(2\theta)+P_xP_y\cos(2\theta)-c^2+cP_z=0. \quad (5)$$

Equation 5 is a non-linear equation in $\theta$ that requires a separate optimization to compute a value for $\theta$. Once we have $\theta$, r is computed from Eq. 4 and the point Q can be computed with Equation 1. Then the minimum distance from P to the helicoid is $\|\overrightarrow{QP}\|$.

Solving Equation 5 is a time-consuming computation. Therefore, we also developed a faster method for computing an approximate distance from a point to a helicoid. This approximate method allows us to compute the shortest distance in a two-step hybrid approach. The fast, approximate method is used to quickly move the yarn model close to, but not on the helicoid. The slower, accurate method is then employed to fine-tune the yarn configuration, leaving it lying exactly on the helicoid surface. The hybrid approach provides about 4× speed-up over only using the slower, accurate method.

Figure 9:
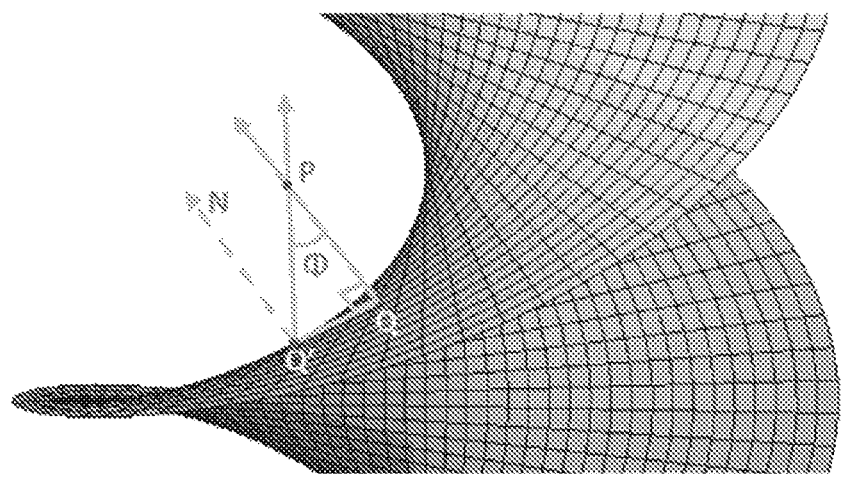
FIG. 9 is a geometric model of a helicoid illustrating normal and tangent lines used in an approximation of an optimized yarn path across the surface of the helicoid.

FIG. 9 illustrates the approximate distance computation. In FIG. 9, the distance between P and Q can be approximated by assuming that Q and Q' have the same r value, and that triangle PQQ' is a right triangle.

The approximate distance calculations make reasonable, but not strictly valid, assumptions. See FIG. 9. P is any point within distance $R_h$ from the Z-axis. Let Q be the point on the helicoid that is closest to P, and Q' be the closest point on the helicoid with the same X and Y coordinates as P. The distance PQ' (d') can be computed as $$\theta'=\tan^{-1}(P_y/P_x) \quad (6)$$

$$d'=(P_z-c\theta')\bmod c/2 \quad (7)$$

where $\theta'$ is the angular parameter for P and Q', and $c\theta'$ is the z value for $\theta'$ in the helicoid's first cycle. Applying the modulus ensures that the distance d' is computed in the correct cycle.

The normal to the helicoid surface can be computed as the cross product of two tangents, $$\vec{n} = \frac{\partial H}{\partial r} \times \frac{\partial H}{\partial \theta} \quad (8)$$

$$\vec{n} = c\,\sin(\theta)\hat{i} - c\,\cos(\theta)\hat{j} + r\hat{k} \quad (9)$$

where $(r, \theta)$ are the polar coordinates of the point Q. Since we don't have the exact location of Q, we will use the X and Y coordinates of point P to compute r, $$r \approx \sqrt{P_x^2+P_y^2} \quad (10)$$

The line PQ' is parallel to the Z-axis. Hence the angle $\phi$ between the normal and the Z-axis is given by the inverse cosine of the dot product of the normalized vectors, $$\phi = \cos^{-1}\left(\frac{r}{\sqrt{c^2+r^2}}\right) \quad (11)$$

As seen in FIG. 9, line QQ' lies approximately along the surface of helicoid, while line PQ lies along the normal to the surface. This means that triangle PQQ' is close to being a right triangle. This leads, from Eqns. 7 and 11, to the approximate distance between points P and Q as the following, $$\text{dist}(P,Q) \approx d' \cos(\phi) \quad (12)$$

The shape of the yarn path is governed by different forces acting on yarn, each of which is defined by a separate energy term. The yarn is repelled from the helicoid, while at the same time its length is shortened, which effectively stretches it across the surface. Thus, the yarn path stabilizes when the energies are balanced and it becomes as short as possible without penetrating the helicoid.

The total energy of the yarn is given by $$E_{total} = \alpha E_{len} + \beta E_{dist}. \quad (13)$$

Here $\alpha$ and $\beta$ are scaling factors that allow us to control the influence of the individual energy terms. Stretching of the yarn is emulated by reducing the length of the yarn. The corresponding energy is computed as $$E_{len} = (\text{Yarn}_{length} - \text{Target}_{length})^2, \quad (14)$$

where $\text{Yarn}_{length}$ is the total length of the yarn and $\text{Target}_{length}$ is a target length that is shorter than the initial length. We define $\text{Target}_{length}$ as half of the initial length of the yarn polyline.

The center of the yarn should be a distance equal to the yarn radius ($R_y$) from the helicoid, otherwise the yarn will penetrate the helicoid. We therefore define a distance energy to maintain this constraint based on the distance d computed from Equations 4, 5 and 1, $$E_{dist} = (d - R_y) \log(d/R_y). \quad (15)$$

Figure 10C:
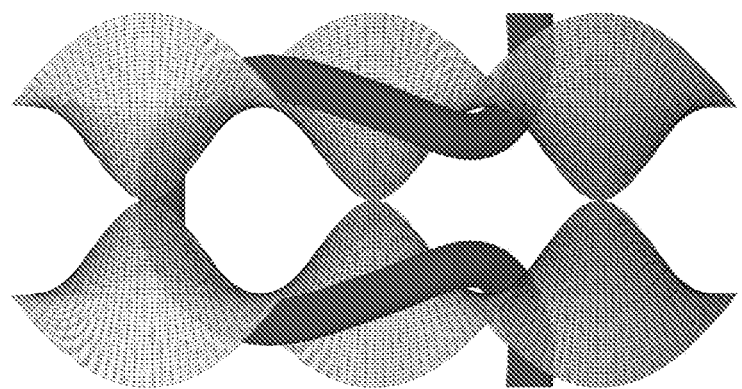
FIG. 10C illustrates reflection of the half loop to create a loop that may be used to generate models of all-knit and rib fabrics.
Figure 10B:
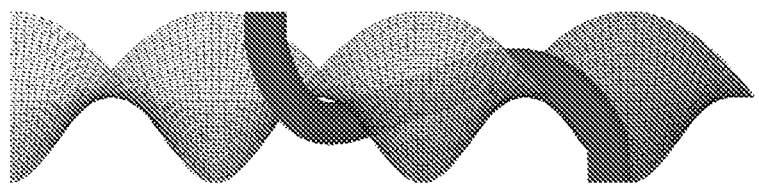
FIG. 10B illustrates configuration of the spline after optimization.
Figure 10A:
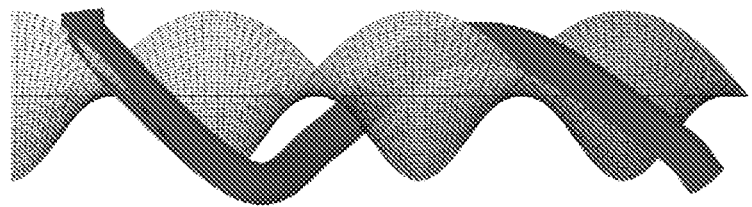
FIG. 10A illustrates an initial yarn path defined around a helicoid. The yarn is specified as a spline with partially constrained endpoints that defines half of a stitch loop.
Figure 11A:
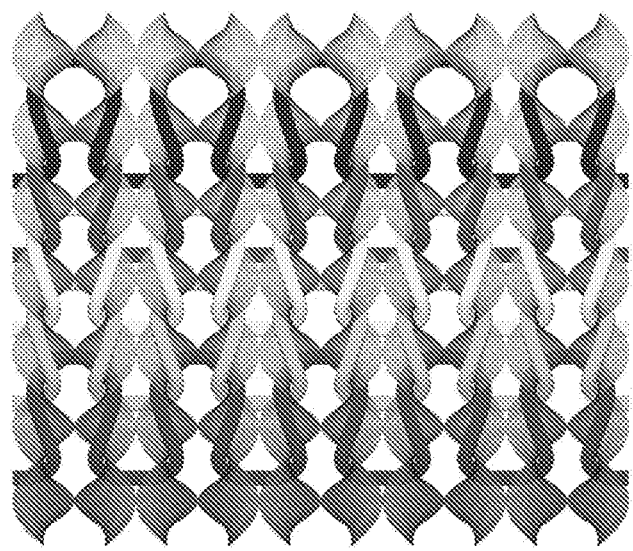
FIG. 11A illustrates a geometric model of the yarns in an all-knit fabric showing the helicoid scaffolding.
Figure 11B:
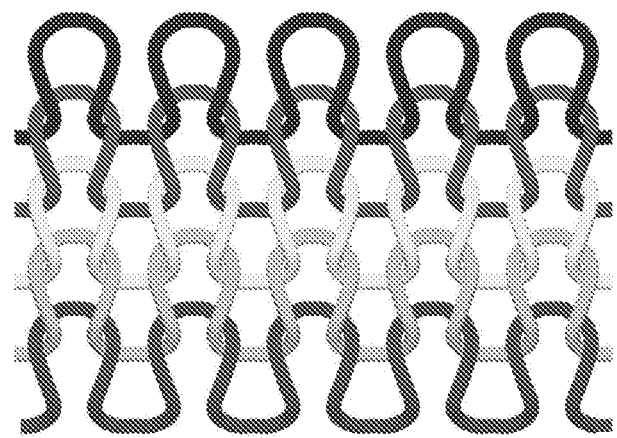
FIG. 11B illustrates the geometric model of FIG. 10A with the helicoid scaffolding removed.

To produce geometric models of the yarns in a knitted fabric using helicoid scaffolds, we first place a spline around a helicoid in the approximate desired configuration. This spline represents only half of a single loop of a knit stitch. Its end points are partially constrained. See FIG. 10A. The remaining points on the spline are then modified, through an optimization process, in order to minimize Equation 13; thus producing an optimized spline lying on the helicoid. See FIG. 10B. The optimized half loop is then reflected to create a full loop. See FIG. 10C. This loop may be duplicated and shifted to create a model of an all-knit fabric. See FIGS. 11A and 11B.

Figure 12:
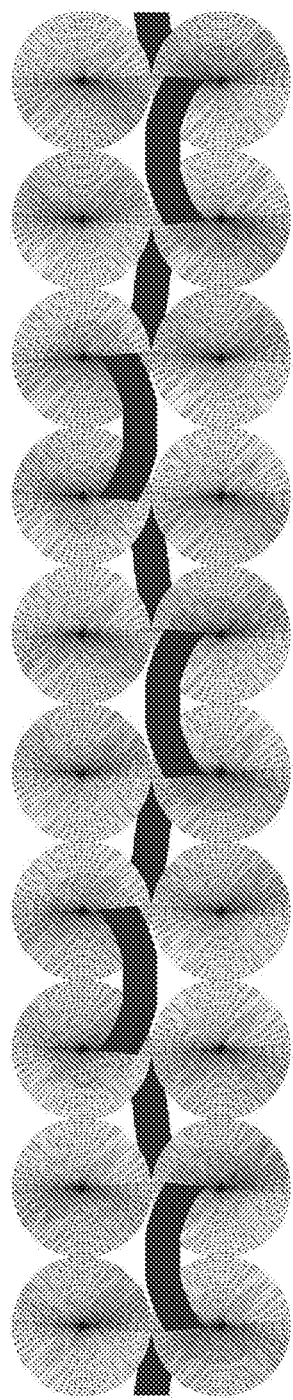
FIG. 12 is a top view of a rib fabric showing how knit stitches may be reflected and shifted to produce a rib fabric.
Figure 13A:
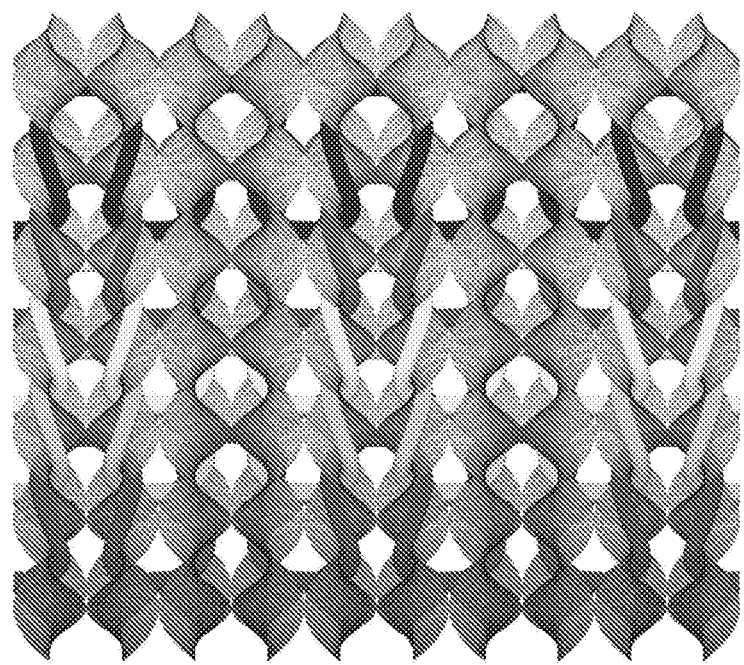
FIG. 13A illustrates a geometric model of the yarns in a rib fabric showing the helicoid scaffolding.
Figure 13B:
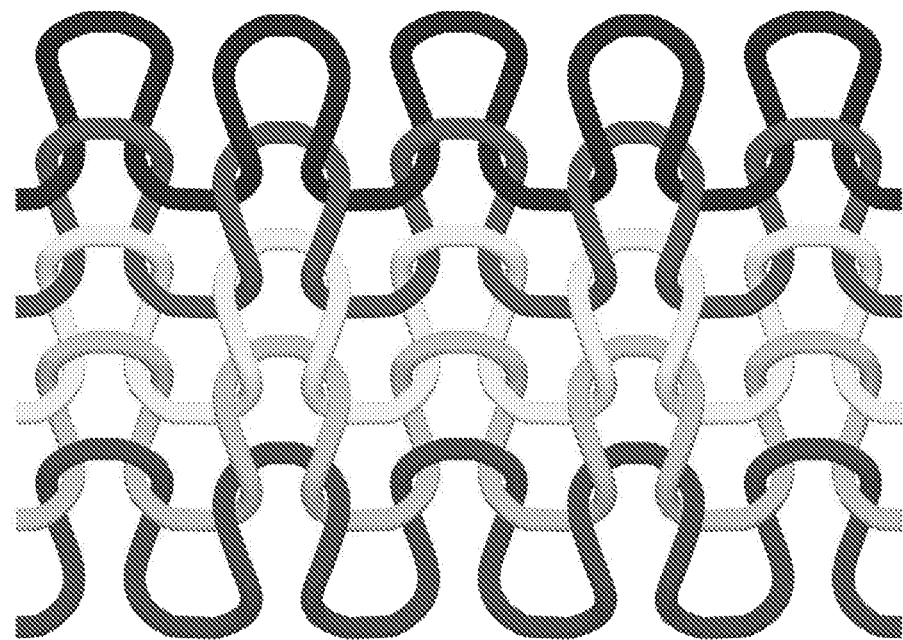
FIG. 13B illustrates the model of FIG. 13A without the scaffolding.

A second plane of reflected and shifted helicoids allows us to define purl stitches. See FIG. 12. The optimized full loop may be duplicated, reflected, and translated multiple times in order to make models consisting of knit and purl stitches. This leads to the generation of geometric models of rib fabrics, which consist of alternating columns of knit and purl stitches. See FIGS. 13A and 13B. These resulting stitch geometries generated on helicoids clearly demonstrate the different stitch shapes, due to the transition between front and back planes of the helicoid lattice and resulting directional forces of a knitted material. These directional forces of the loop will inform the overall topology of a knitted textile.

Figure 14C:
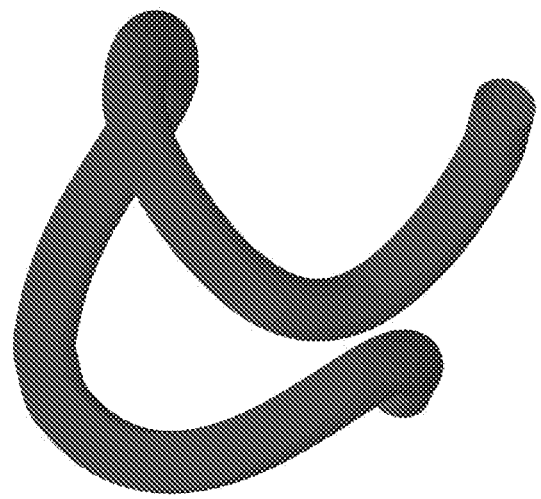
FIG. 14C illustrates a full loop produced by reflecting the optimized garter half loop.
Figure 14B:
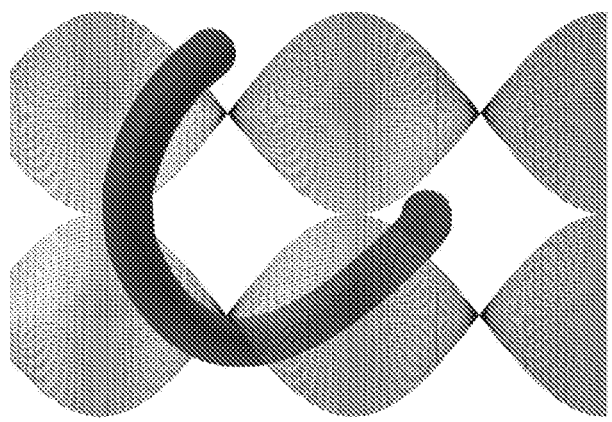
FIG. 14B illustrates an optimized path yarn for garter pattern.
Figure 14A:
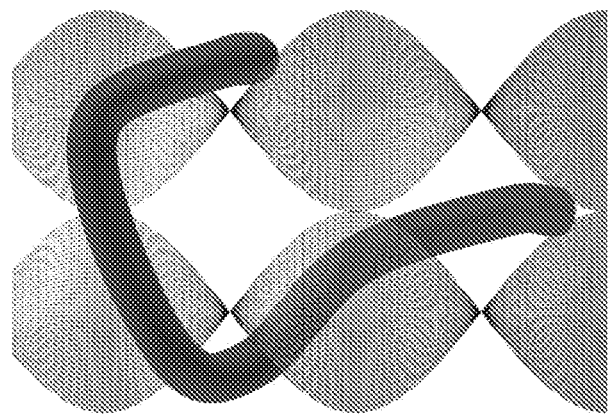
FIG. 14A illustrates an Initial yarn path for a garter pattern.
Figure 15A:
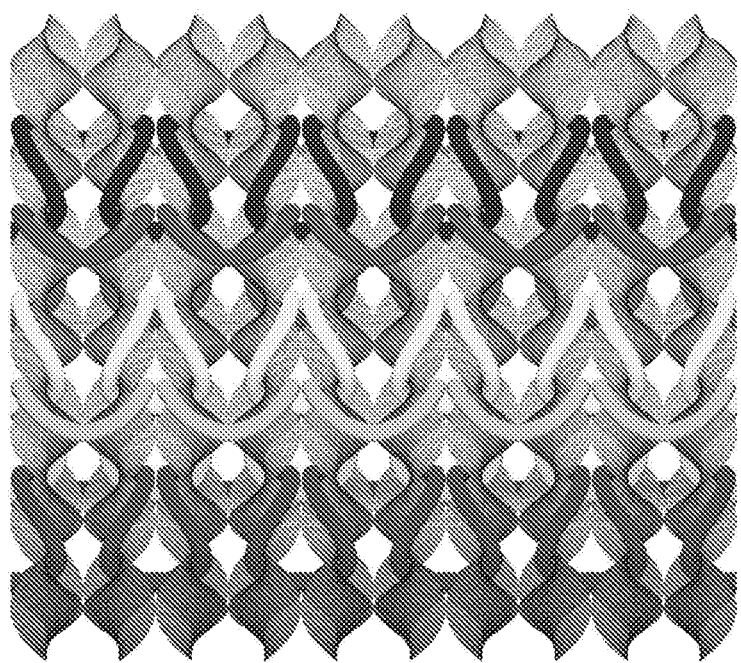
FIG. 15A illustrates a geometric model of the yarns in a garter fabric showing the helicoid scaffolding.
Figure 15B:
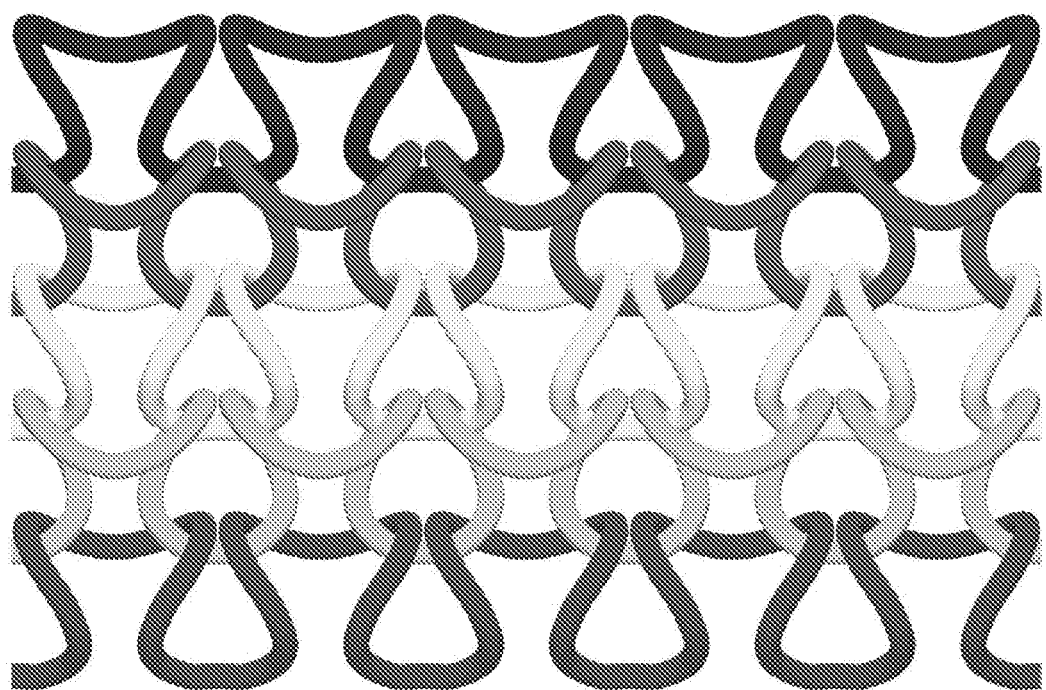
FIG. 15B illustrates the geometric model of FIG. 15A with the helicoid scaffolding removed.

The initialization and optimization of the yarn used in a garter fabric (alternating rows of knit and purl stitches) is slightly different, since it is a half loop that spans two helicoids, one behind the other. This specific loop is needed in order to model how a knit stitch transitions into a purl stitch going in the upward (wale) direction. With the right-handed helicoid centered at the origin, the left-handed one is centered at (2R,0,0). FIGS. 14A and 14B show the initial and optimized yarns for a garter half loop, with the full loop in FIG. 14C. The loop of FIG. 14C is duplicated, reflected and shifted to produce a complete garter fabric, as seen in FIGS. 15A and 15B.

Figure 16:
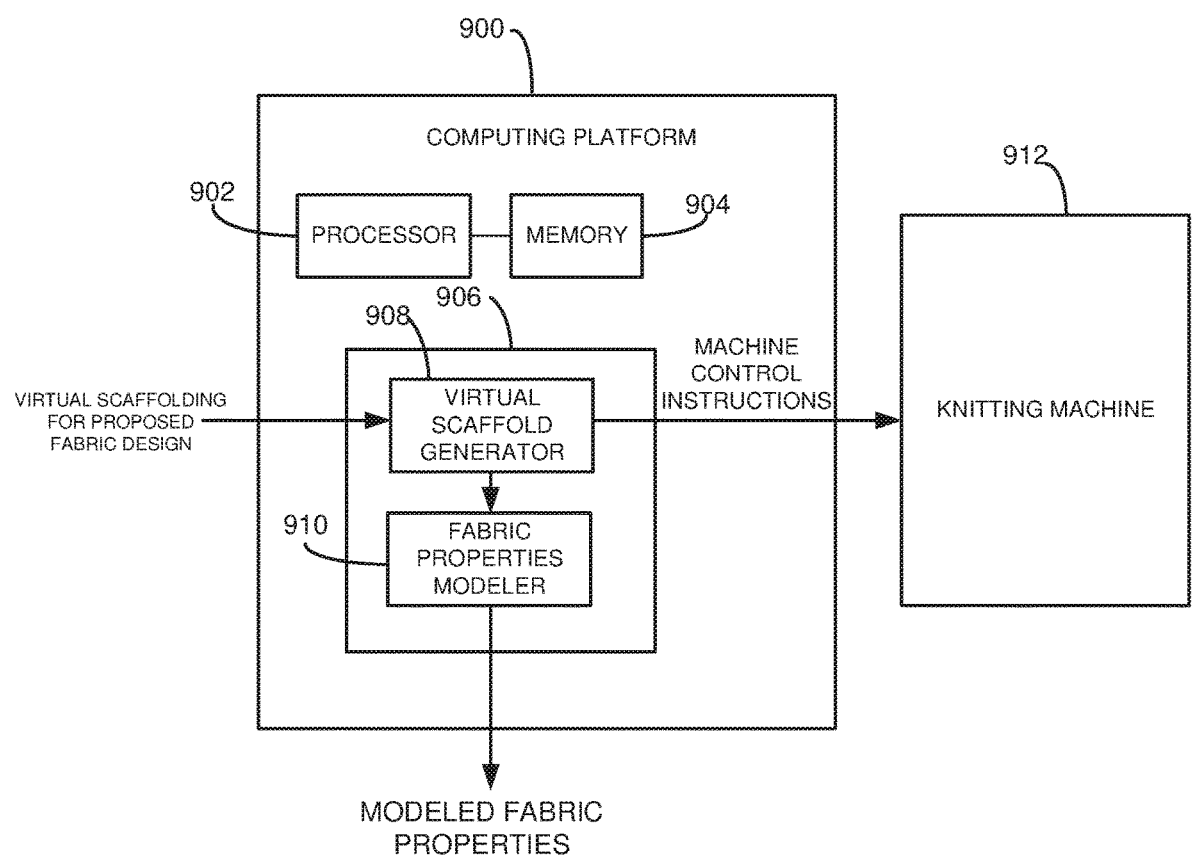
FIG. 16 is a block diagram illustrating an exemplary software implementation of an automated system for textile fabric design using bicontinuous surfaces.

FIG. 16 is a block diagram of a proposed software implementation of the subject matter described herein. In FIG. 16, a computing platform 900 includes a processor 902 and memory 904. A textile fabric modeler 906 may execute on processor 902 and/or by embodied by computer executable instructions residing in memory 904. Textile fabric modeler 906 includes a virtual scaffold generator 908 and a fabric properties modeler 910. Virtual scaffold generator 908 receives an input, a virtual scaffold formed of bicontinuous surfaces selected by a user to selecting a virtual scaffold of bicontinuous surfaces. The bicontinuous surfaces define textile fabrication pathways to model spatial relationships between the pathways and the yarns in a desired yarn pattern of a textile fabric design. The virtual scaffold may be a virtual representation of the physical scaffolds formed of helicoid pairs illustrated in FIGS. 1A-1T or in the dual layer of helicoids in a checker board arrangement of left-hand and right-hand helicoids shown in FIGS. 8C and 8D. Examples of the virtual representation of the scaffold that may be generated by virtual scaffold generator 908 are illustrated in FIGS. 9A-9C, 10A, 11, 12A, 13A, 13B, and 14A. The arrangement of helicoid pairs selected to model a particular fabric design may be selected graphically by the user using the handedness conventions described above.

Virtual scaffold generator 908 constructs a yarn pathway across the bicontinuous surfaces that form the virtual scaffolding. The yarn pathway may be constructed to follow the physical yarn pathways of any of FIGS. 1B-1T, FIG. 4A, FIG. 4B, FIG. 5C, FIG. 5D, FIG. 8A, FIG. 8B, FIG. 8D, and FIGS. 8F-8J. Examples of modeled yarn following a virtual model of the physical yarn pathway that may be generated by virtual scaffold generator 908 are found, for example, in FIGS. 10A-10C, FIG. 11A, FIG. 11B, FIG. 12, FIG. 13A, FIG. 13B, FIGS. 14A-14C, FIG. 15A, and FIG. 15B.

Fabric properties modeler 910 removes or releases tension from the virtual scaffolding, allowing the yarns to relax, and determines a physical property of the textile fabric design. Examples of fabric models with the virtual scaffolding removed are found, for example, in FIGS. 11B, 13B, 14C, and 15B. The energy minimization steps described above may be used to simulate relaxation of the fabric. As described above, the physical property may include a relaxation property, such as a bending, curling, or twisting property of the textile fabric design once the scaffolding is removed. In one example, fabric properties modeler 910 may model physical relaxation of the fabric, for example as illustrated in FIG. 1H. Textile fabric modeler 906 may also output control instructions to control knitting by a knitting machine 912 based on a modeled textile fabric design.

Figure 17:
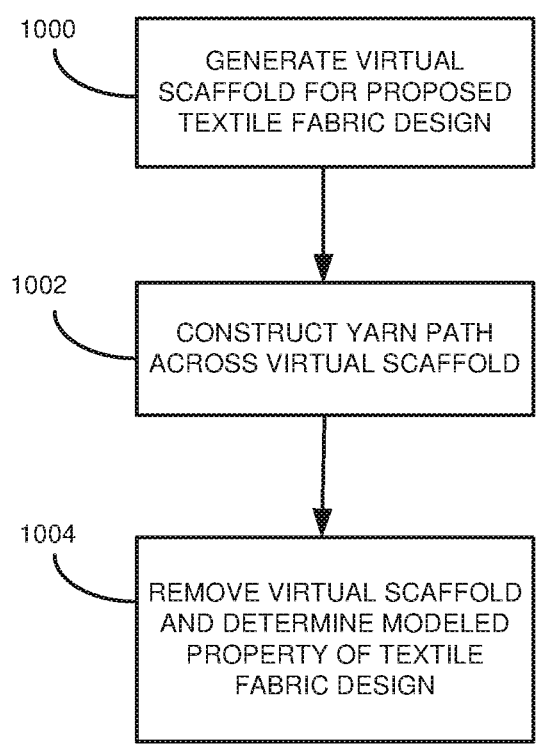
FIG. 17 is a flow chart illustrating an exemplary process for automated textile fabric design using bicontinuous surfaces.

FIG. 17 is a flow chart illustrating an exemplary process for modeling textile structures using bicontinuous surfaces. Referring to FIG. 17, in step 1000, a virtual scaffolding of bicontinuous services is selected, defining textile fabrication pathways, to model spatial relationships between the pathways and the yarns in a desired yarn pattern of a textile fabric design. For example, a user may select a virtual scaffolding of helicoids that are used to model stitches in a looped fabric design or structure, such as a knit fabric design or structure. The helicoids may be paired to model the handedness of yarn pathways in the looped fabric design. Examples of helicoid pairs used to model knit and purl stitches are described above.

In step 1002, a yarn pathway across the bicontinuous surfaces that form the virtual scaffolding is constructed. For example, yarns may be modeled to follow the surfaces of the helicoid as illustrated conceptually in FIGS. 8A and 8B.

In step 1004, the virtual scaffolding is removed, or the tension is released, allowing the yarns to relax, and the physical property of the textile fabric is determined. For example, fabric properties modeler 910 may remove or release tension from the virtual scaffolding, which removes the tension from the virtual textile structure constructed over the scaffolding, and the structure will relax, to illustrate relaxation properties of the fabric, including bending and twisting properties of the fabric.

6. Conclusions

Through a combination of artistic, scientific and design based thinking, we have developed a novel method of mathematically defining textile fabrication pathways, modeling spatial relationships between the pathways and the yarns in a desired yarn patterns in textile architectures using families of bicontinuous surfaces. Development of a software program using this platform will allow for advanced textile modelling that predicts the effects of physical properties of yarn materials in specific textile architectures. This kind of software could provide commercial companies the flexibility needed to support more customizable solutions of functional fabrics, resulting in first-to-market advantage, product differentiation and/or access to new markets. It could also create more universal access to textile design and software tools that will enable not only industry but also academic institutions and publicly funded research laboratories to participate in fibers and textile designs, otherwise inaccessible due to high costs. By making the design of textiles more accessible and more understandable, we can drive innovation of smart textile development using advanced manufacturing methodologies.

7. Literature Cited

The disclosure of each of the following references is hereby incorporated herein by reference in its entirety.

[1] F. T. Peirce, F.Inst.P., and F.T.I., "5—the Geometry of Cloth Structure," *Journal of the Textile Institute Transactions*, vol. 28, no. 3, pp. T45-T96, March 1937.

[2] G. H. Hotte, "An Investigation of Fabric Structure and Its Relation to Certain Physical Properties," *Textile Research Journal*, vol. 20, no. 12, pp. 811-828, 1950.

[3] G. A. V. Leaf and R. D. Anandjiwala, "A Generalized Model of Plain Woven Fabric," *Textile Research Journal*, vol. 55, no. 2, pp. 92-99, February 1985.

[4] X. Hu, Y. Bai, S. Cui, X. Du, and Z. Deng, "Review of cloth modeling," in 2009 *ISECS International Colloquium on Computing, Communication, Control, and Management*, 2009, vol. 4, pp. 338-341.

[5] J. Long, K. Burns, and J. (James) Yang, "Cloth Modeling and Simulation: A Literature Survey," in *Digital Human Modeling*, 2011, pp. 312-320.

[6] S. Jevšnik, F. Kalaoğlu, S. Terliksiz, and J. Purgaj, "Review of computer models for fabric simulation," *Tekstilec*, vol. 57, no. 4, pp. 300-314, 2014.

[7] L. Zhao et al., "Permeability measurements and modeling of topology-optimized metallic 3-D woven lattices," *Acta Materialia*, vol. 81, pp. 326-336, December 2014.

[8] L. Zhao et al., "Experimental investigation of 3D woven Cu lattices for heat exchanger applications," *International Journal of Heat and Mass Transfer*, vol. 96, pp. 296-311, May 2016.

[9] Y. Zhang, S. Ha, K. Sharp, J. K. Guest, T. P. Weihs, and K. J. Hemker, "Fabrication and mechanical characterization of 3D woven Cu lattice materials," *Materials & Design*, vol. 85, pp. 743-751, November 2015.

[10] J. K. Guest, J. H. Prevost, and T. Belytschko, "Achieving minimum length scale in topology optimization using nodal design variables and projection functions," *Int. J. Numer. Meth. Engng.*, vol. 61, no. 2, pp. 238-254, September 2004.

[11] M. Osanov and J. K. Guest, "Topology Optimization for Architected Materials Design," *Annual Review of Materials Research*, vol. 46, no. 1, pp. 211-233, 2016.

[12] S. Grishanov, V. Meshkov, and A. Omelchenko, "A Topological Study of Textile Structures. Part I: An Introduction to Topological Methods," *Textile Research Journal*, vol. 79, no. 8, pp. 702-713, May 2009.

[13] S. A. Grishanov, V. R. Meshkov, and A. Omelchenko, "A topological study of textile structures. Part II: Topological invariants in application to textile structures," 2009.

[14] E. A. Matsumoto, R. D. Kamien, and C. D. Santangelo, "Smectic pores and defect cores," *Interface Focus*, p. rsfs20110095, March 2012.

[15] C. D. Santangelo and R. D. Kamien, "Triply periodic smectic liquid crystals," *Phys. Rev. E*, vol. 75, no. 1, p. 11702, January 2007.

[16] C. D. Santangelo and R. D. Kamien, "Elliptic Phases: A Study of the Nonlinear Elasticity of Twist-Grain Boundaries," *Phys. Rev. Lett.*, vol. 96, no. 13, p. 137801, April 2006.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modeling textile structures using bicontinuous surfaces, the method comprising:
   selecting a virtual scaffold of bicontinuous surfaces defining textile fabrication pathways to model spatial relationships between the pathways and yarns in a desired yarn pattern of a textile fabric design;
   constructing a yarn pathway across the bicontinuous surfaces that form the virtual scaffold; and
   removing or releasing tension from the virtual scaffold, thereby allowing the yarns to relax and determining a physical property of the textile fabric design.

2. The method of claim 1 wherein generating the virtual scaffold of bicontinuous surfaces includes forming the virtual scaffold using helicoid pairs.

3. The method of claim 2 wherein generating the virtual scaffold using helicoid pairs includes using the helicoid pairs to model handedness of yarn pathways in a looped fabric structure.

4. The method of claim 3 wherein the looped fabric structure comprises a knit fabric structure.

5. The method of claim 4 wherein the knit fabric structure comprises a weft knit fabric structure.

6. The method of claim 4 wherein the knit fabric structure comprises a warp knit fabric structure.

7. The method of claim 4 wherein the helicoid pairs include a left-hand helicoid followed by a right-hand helicoid to model a knit stitch in the textile fabric design.

8. The method of claim 4 wherein the helicoid pairs include a right-hand helicoid followed by a left-hand helicoid to model a purl stitch in the textile fabric design.

9. The method of claim 4 wherein the helicoid pairs include pairs of left-right and right-left helicoids that respectively model knit and purl stitches in the textile fabric design.

10. The method of claim 1 wherein constructing the yarn pathway includes modeling a transfer stitch by extending a virtual loop of yarn from a first helicoid pair to a second helicoid pair adjacent to the first helicoid pair in a helicoid lattice while remaining on a designated surface in the helicoid lattice.

11. The method of claim 1 wherein constructing the yarn pathway includes modeling a tuck stitch by skipping a row in a helicoid lattice while remaining on a designated surface in the helicoid lattice.

12. The method of claim 1 wherein constructing the yarn pathway includes modeling a miss stitch by modeling a virtual yarn loop to skip a helicoid pair while remaining on a designated surface in the helicoid lattice.

13. The method of claim 1 wherein constructing the yarn pathways includes constructing a half loop of virtual yarn by placing a spline around a helicoid to form the half loop and mirroring the half loop to form a full loop of the virtual yarn.

14. The method of claim 13 wherein constructing the yarn pathway includes replicating and shifting or translating the full loop to create a model of the textile fabric design.

15. The method of claim 1 wherein constructing the yarn pathway includes constructing alternating rows of knit and purl stitches of virtual yarn to form a simulated garter fabric.

16. A system for modeling textile structures using bicontinuous surfaces, the system comprising: a processor; and a memory;
   a virtual scaffold generator for allowing selection of a virtual scaffold of bicontinuous surfaces defining textile fabrication pathways to model spatial relationships between the pathways and yarns in a desired yarn pattern of a textile fabric design and constructing a yarn pathway across the bicontinuous surfaces that form the virtual scaffold; and
   a fabric properties modeler for removing or releasing tension from the virtual scaffold, thereby allowing the yarns to relax, and determining a physical property of the textile fabric design.

17. The system of claim 16 wherein generating the virtual scaffold of bicontinuous surfaces includes forming the virtual scaffold using helicoid pairs.

18. The system of claim 17 wherein generating the virtual scaffold using helicoid pairs includes using the helicoid pairs to model handedness of yarn pathways in a looped fabric structure.

19. The system of claim 18 wherein the looped fabric structure comprises a knit fabric structure.

20. The system of claim 19 wherein the knit fabric structure comprises a weft knit fabric structure.

21. The system of claim 19 wherein the knit fabric structure comprises a warp knit fabric structure.

22. The system of claim 19 wherein the helicoid pairs include a left-hand helicoid followed by a right-hand helicoid to model a knit stitch in the textile fabric design.

23. The system of claim 19 wherein the helicoid pairs include a right-hand helicoid followed by a left-hand helicoid to model a purl stitch in the textile fabric design.

24. The system of claim 19 wherein the helicoid pairs include pairs of left-right and right-left helicoids that respectively model knit and purl stitches in the textile fabric design.

25. The system of claim 16 wherein constructing the yarn pathways includes modeling a tuck stitch by skipping a row in a helicoid lattice while remaining on a designated surface in the helicoid lattice.

26. The system of claim 16 wherein constructing the yarn pathways includes modeling a miss stitch by modeling a virtual yarn loop to skip a helicoid pair while remaining on a designated surface in the helicoid lattice.

27. The system of claim 16 wherein constructing the yarn pathway includes constructing a half loop of virtual yarn by placing a spline around a helicoid to form the half loop and mirroring the half loop to form a full loop of the virtual yarn.

28. The system of claim 27 wherein constructing the yarn pathway includes replicating and shifting or translating the full loop to create a model of the textile fabric design.

29. The system of claim 16 wherein constructing the yarn pathway includes constructing alternating rows of knit and purl stitches of virtual yarn to form a simulated garter fabric.

30. A non-transitory computer readable medium having stored thereon executable instructions that when executed by a processor of a computer control the computer to perform steps comprising:
   selecting a virtual scaffold of bicontinuous surfaces defining textile fabrication pathways to model spatial relationships between the pathways and yarns in a desired yarn pattern of a textile fabric design;
   constructing a yarn pathway across the bicontinuous surfaces that form the virtual scaffold; and
   removing or releasing tension from the virtual scaffold, thereby allowing yarns to relax, and determining a physical property of the textile fabric design.

* * * * *